(12) United States Patent
Loring et al.

(10) Patent No.: US 8,073,725 B2
(45) Date of Patent: Dec. 6, 2011

(54) APPOINTMENT SCHEDULING SYSTEM

(76) Inventors: John Loring, Kensington, NH (US);
Carl Lambert, Chelmsford, MA (US);
Justin Garfield, Lowell, MA (US);
Marco Peterson, Newburyport, MA (US)

( * ) Notice: Subject to any disclaimer, the term of this patent is extended or adjusted under 35 U.S.C. 154(b) by 564 days.

(21) Appl. No.: 12/359,940

(22) Filed: Jan. 26, 2009

(65) Prior Publication Data

US 2010/0191566 A1  Jul. 29, 2010

(51) Int. Cl.
*G06F 9/46* (2006.01)
(52) U.S. Cl. ..................................... 705/7.18
(58) Field of Classification Search .................. 705/7.18
See application file for complete search history.

(56) References Cited

U.S. PATENT DOCUMENTS

| | | | |
|---|---|---|---|
| 4,769,796 A | 9/1988 | Levine | |
| 5,050,077 A | 9/1991 | Vincent | |
| 5,774,867 A | 6/1998 | Fitzpatrick | |
| 5,867,822 A | 2/1999 | Sankar | |
| 5,899,979 A | 5/1999 | Miller | |
| 5,960,406 A | 9/1999 | Rasansky | |
| 6,006,242 A | 12/1999 | Poole | |
| 6,047,260 A | 4/2000 | Levinson | |
| 6,064,975 A | 5/2000 | Moon | |
| 6,101,480 A * | 8/2000 | Conmy et al. | ............... 705/7.18 |
| 6,216,110 B1 | 4/2001 | Silverberg | |
| 6,236,396 B1 | 5/2001 | Jenson | |
| 6,253,366 B1 | 6/2001 | Mutschler | |
| 6,345,260 B1 | 2/2002 | Cummings | |
| 6,480,830 B1 | 11/2002 | Ford | |
| 6,519,617 B1 | 2/2003 | Wanderski | |
| 6,594,637 B1 | 7/2003 | Furukawa | |
| 6,898,569 B1 | 5/2005 | Bansal | |
| 7,039,596 B1 | 5/2006 | Lu | |
| 7,054,905 B1 | 5/2006 | Hanna | |
| 7,174,303 B2 | 2/2007 | Glazer | |
| 7,174,517 B2 | 2/2007 | Barnett | |
| 7,188,073 B1 * | 3/2007 | Tam et al. | ..................... 705/7.16 |
| 7,251,786 B2 | 7/2007 | Wynn | |
| 7,283,970 B2 | 10/2007 | Cragun | |
| 7,359,864 B2 | 4/2008 | Carlson | |
| 7,693,736 B1 * | 4/2010 | Chu et al. | ..................... 705/7.19 |
| 8,015,049 B1 * | 9/2011 | Tam et al. | ..................... 705/7.18 |
| 2003/0036941 A1 * | 2/2003 | Leska et al. | ........................ 705/9 |
| 2003/0149605 A1 * | 8/2003 | Cragun et al. | .................... 705/8 |
| 2003/0233265 A1 * | 12/2003 | Lee et al. | .......................... 705/8 |
| 2006/0167725 A1 * | 7/2006 | Grunspan et al. | .................. 705/5 |
| 2006/0293943 A1 * | 12/2006 | Tischhauser et al. | ............. 705/9 |
| 2008/0097817 A1 * | 4/2008 | Solaru | ................ 705/9 |
| 2008/0167937 A1 * | 7/2008 | Coughlin et al. | ................. 705/9 |
| 2008/0243582 A1 * | 10/2008 | Chen et al. | ........................ 705/9 |

* cited by examiner

*Primary Examiner* — Romain Jeanty
(74) *Attorney, Agent, or Firm* — Lambert & Associates; Gary E. Lambert; David J. Connaughton, Jr.

(57) ABSTRACT

The instant invention relates to an appointment scheduling system that allows inviters to define various activities for appointments and to invite invitees to select said appointments. The system utilizes multiple visual user interfaces to allow inviters, invitees and other users to interact with the appointment scheduling system. The system allows for inviter selection of time windows in which appointments may be allowed as well as for the customization of these properties in terms of how often and until when these defined time windows will recur. The system also utilizes various techniques to associate invitees with particular appointment activities received by the invitee through email and/or other correspondence means.

42 Claims, 21 Drawing Sheets

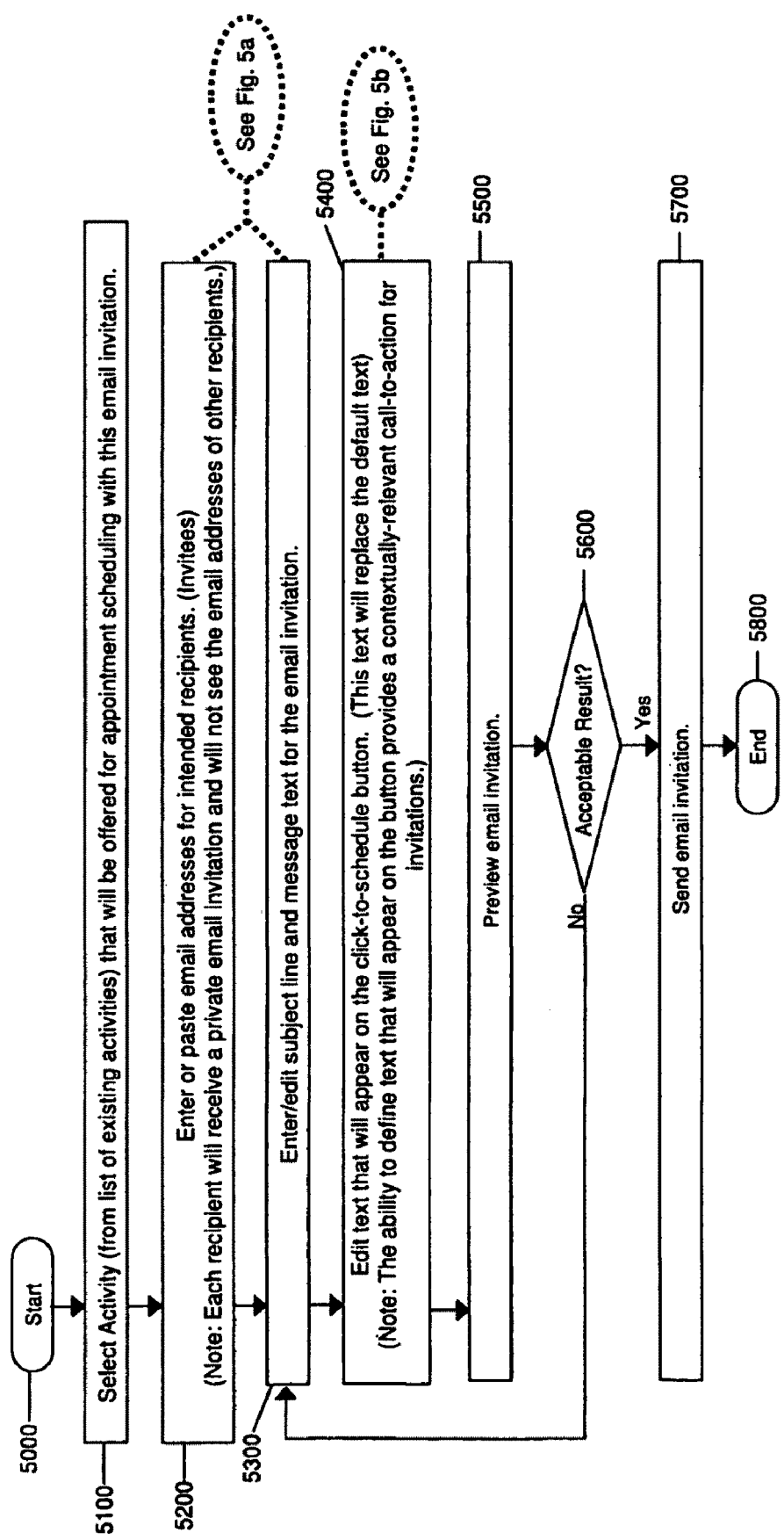

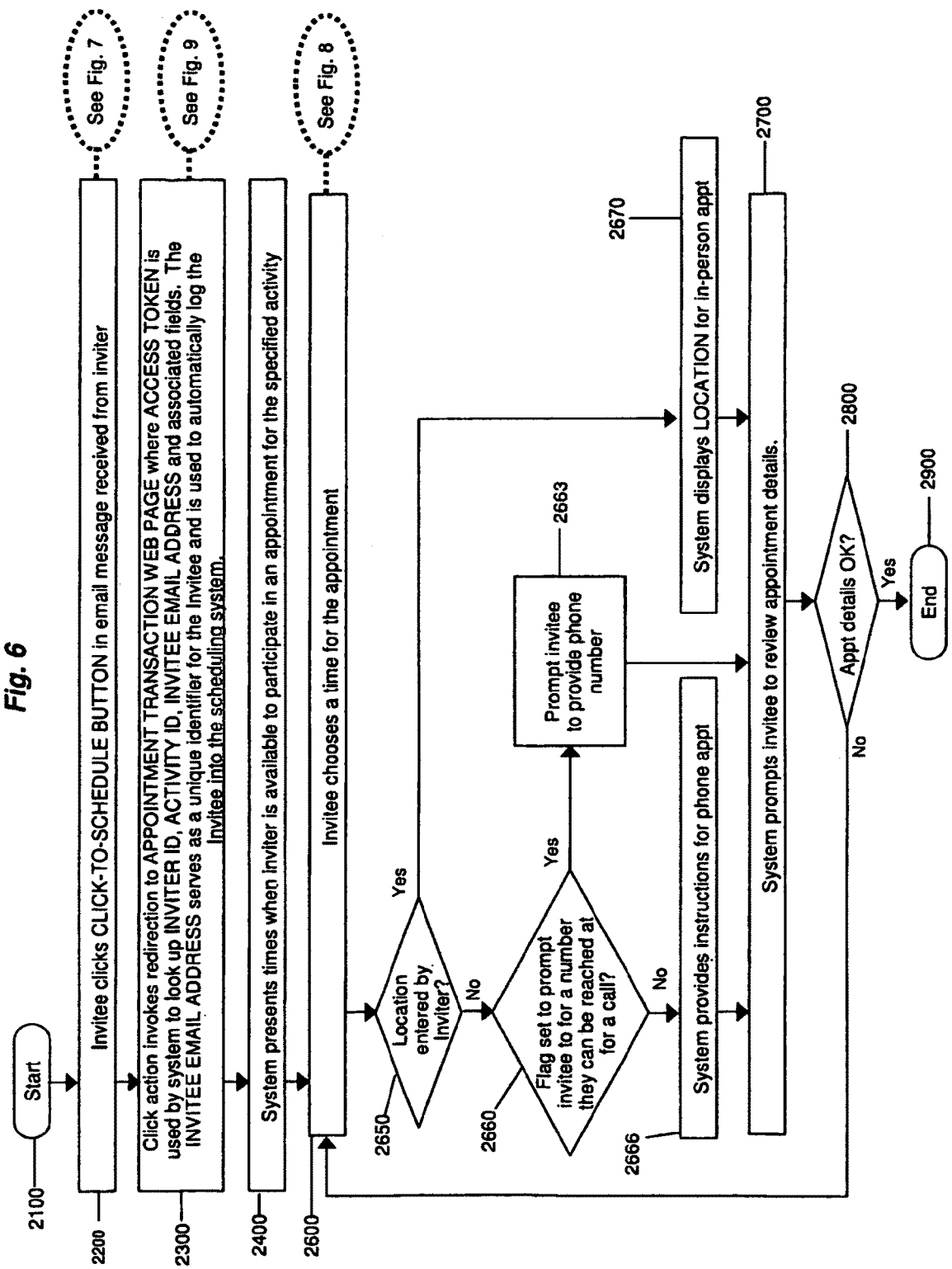

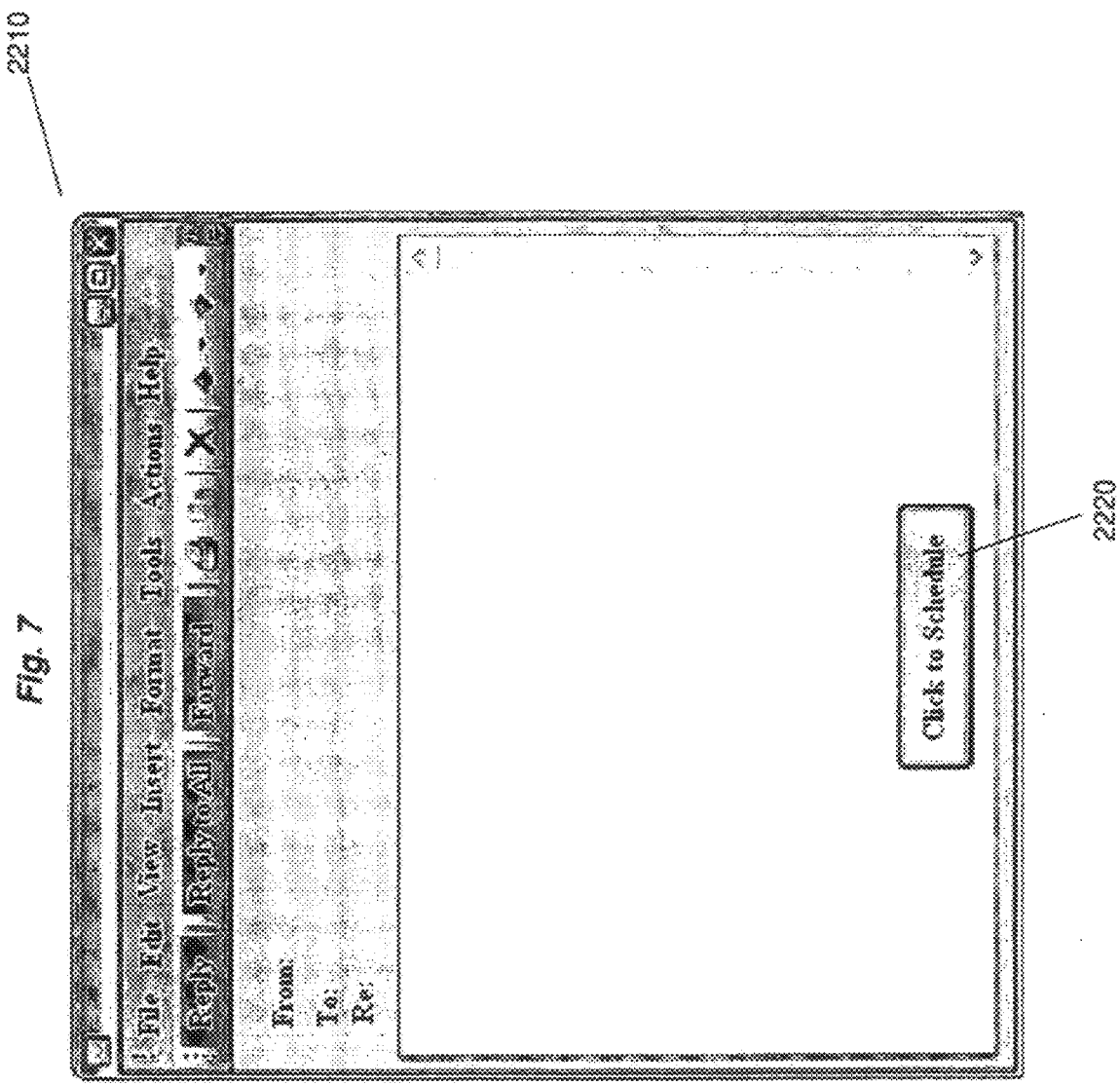

APPOINTMENT SCHEDULING SYSTEM

FIELD OF THE INVENTION

The present invention relates generally to software appointment scheduling systems, and more specifically to software appointment scheduling systems that are "web-based", meaning that the software that implements the system is accessed through the Internet via the World Wide Web by use of a web browser. This distinguishes the present invention from other non-web-based scheduling software systems that require installation of the software on a user's computer in order to run the software.

BACKGROUND OF INVENTION

Some appointment scheduling systems address the need for two or more people to choose a mutually-agreeable time for an ad hoc meeting or phone call. Such systems typically enable a meeting organizer to offer specific timeslots or to share general calendar availability from which the other parties can choose a time. Other appointment scheduling systems address the need for a service provider to offer timeslots to service consumers on an ongoing basis, or during special promotional campaigns, as governed by availability rules defined by the service provider. Both categories of known systems suffer from an array of inconveniences that create a burden for the meeting organizer or service provider, as described below.

Existing systems do not provide a convenient visual mechanism by which a meeting organizer or service provider (collectively "the user") can choose timeslots that will be offered or define availability rules that determine what timeslots will be offered in a scheduling transaction.

Existing systems do not interoperate with the user's primary calendaring system (such as Outlook Calendar and Google Calendar) in order to give the user context for choosing timeslots or defining availability rules, and for automatically inserting booked appointments into the user's primary calendar. This forces the user to manually inspect his/her primary calendar when choosing timeslots or defining availability rules, and forces the user to manually reconcile appointments between his/her primary calendar and the appointment scheduling system when appointments are scheduled.

Existing systems do not provide a mechanism by which availability rules and free/busy information from the user's primary calendar are cross-referenced at the moment a scheduling transaction is initiated as a means to ensure that timeslots offered by the system do not conflict with existing commitments in the user's primary calendar.

Existing systems fail to employ a simple "building-block" approach for configuring the system. This makes it difficult for users to establish an initial configuration to begin taking appointments, and difficult to reconfigure and expand the system in response to changes in user requirements.

Existing systems fail to provide a robust mechanism for users to actively invite customers and colleagues to schedule an appointment for a specific activity or promotional campaign, or to schedule an appointment for an activity chosen from a group of activities defined by the user. Further, existing systems that rely on email invitations to promote appointment scheduling do not provide the ability to embed a customizable action button within the body of an email message as a means to compel action from invitees, and do not provide a mechanism to track the response to email invitations.

SUMMARY OF THE INVENTION

The instant invention, as illustrated herein, is clearly not anticipated, rendered obvious, or even present in any of the prior art, either alone or in any combination thereof. A web-based inviter-to-invitee driven software activity scheduling system, designed to overcome the previously mentioned shortcomings, would give inviters the ability to invite a large number of invitees to make personal appointments with the inviter by clicking a link on a Web page, by responding to a personalized email invitation with an embedded tokenized link or "click-to-schedule" button, or by typing a URL into a Web browser. Further, as a web-based application, users are not tied to any one machine where they may have had to install a scheduling program. Thus the several embodiments of the instant invention are illustrated herein.

Therefore, it is an object of the present invention to overcome the previously mentioned shortcomings found in the prior art web-based software scheduling systems to allow inviters the ability to configure the system to automatically generate available timeslots that will be offered to invitees for scheduling actual physical face-to-face meetings between inviters and invites, and/or actual physical communication via voice and/or other actual means to physically communicate (such as telephone conferences, video conference and the like). Whereby the methods of configuring the system to automatically generate timeslots that will be offered include: clicking on a web-based calendar grid to choose specific timeslots that will be offered, or clicking and dragging on a web-based calendar grid to open windows of availability in which timeslots will be offered. Further, these windows of availability defined by the inviter may be recurred from week to week to end at a future date selected by the inviter. Later, at the moment an invitee seeks an appointment, the system will cross-reference free/busy information from this inviter's primary calendar and will not offer timeslots that would conflict with existing commitments in the inviter's primary calendar.

Another Object of the present invention is to provide a method by which users can define an activity to be offered for appointment scheduling, establish properties for the activity such as its name and duration, establish whether appointments for the activity will be held in person or via telephone, establish availability rules that govern what timeslots will be offered for the activity, and publish a unique tokenized schedule link (Web URL) where invitees can schedule an appointment for the activity. Users can create an unlimited number of such activities with associated tokenized schedule links. In the present invention, such activities serve as basic building blocks for configuring the appointment scheduling system, and for providing actionable schedule links that can be embedded by the user on Web pages and in email invitations.

Another object of the present invention is to provide a method by which the system can embed a special modified version of the aforementioned tokenized action link in email invitations whereby the modified token includes a reference to the invitee's unique email address. This reference makes it possible for the system to automatically identify and authenticate invitees for the scheduling transaction, as well as to track whether invitees have opened and responded to email invitations to establish an actual physical face-to-face meetings between inviters and invites, and/or actual physical communication via voice and/or other actual means to physically communicate (such as telephone conferences, video conference and the like).

Another object of the invention is provide a method by which the system can embed a customizable action button in email messages to perform the same function as the special modified version of the tokenized action link. For example, the action button can be customized by the user to carry a label such as "Click To Schedule An Appointment For Office Hours", thereby unambiguously compelling the invitee to initiate a scheduling transaction to establish actual physical face-to-face meetings between inviters and invites, and/or actual physical communication via voice and/or other actual means to physically communicate (such as telephone conferences, video conference and the like).

Another object of the present invention is to make it easy for users to define availability rules that govern what timeslots will be offered by the system for a particular activity, wherein the activity is the purpose for scheduling an actual physical face-to-face meeting. To meet this objective, the system provides a visual interface whereby users can click and drag on a calendar grid to open windows in which they are willing to accept appointments for an activity, as well as to recur windows and define other rules that govern availability. In order to provide context for creating such windows and rules, the system interoperates with the user's primary calendar and represents existing commitments as shaded busy times on the calendar grid.

Another object of the present invention is to provide a mechanism by which availability rules and free/busy information from the user's primary calendar are automatically cross-referenced at the moment a scheduling transaction is initiated as a means to ensure that timeslots offered by the system do not conflict with existing commitments in the user's primary calendar.

Another object of the present invention is to implement one or more methods to support the configuration of complex scheduling systems, using a modular "building block" approach to a system that facilitates the actual physical face-to-face meetings between inviters and invites, and/or actual physical communication via voice and/or other actual means to physically communicate (such as telephone conferences, video conference and the like).

Another object of the present invention is to implement a "building block approach" method to:
1. define a set of scheduled activities, wherein said activities comprise the establishing of actual physical face-to-face meetings between inviters and invites, and/or actual physical communication via voice and/or other actual means to physically communicate (such as telephone conferences, video conference and the like).
2. to define the resource constraints on those activities (a therapist available to schedule a treatment session for example), and
3. to define when a resource is available, wherein that resource is involved in the establishing of said activities.

Another object of the present invention is to implement one or more methods for the quick configuration of complex scheduling systems with multiple resources and multiple schedulable activities by combining "building blocks" in a system is used to establish actual physical face-to-face meetings between inviters and invites, and/or actual physical communication via voice and/or other actual means to physically communicate (such as telephone conferences, video conference and the like).

Another object of the present invention is to implement one or more methods for the driving of appointment transactions using email messaging, wherein driving of appointment transactions using email messaging is used to facilitate the scheduling of actual physical face-to-face meetings between inviters and invites, and/or actual physical communication via voice and/or other actual means to physically communicate (such as telephone conferences, video conference and the like).

Another object of the present invention is to implement one or more methods of auto-generation of available timeslots, wherein the auto-generation of available timeslot is used to facilitate the establishing of actual physical face-to-face meetings between inviters and invites, and/or actual physical communication via voice and/or other actual means to physically communicate (such as telephone conferences, video conference and the like).

Another object of the present invention is to implement one or more methods of visual verification of the auto-generation of available timeslots process or processes, wherein the auto-generation of available timeslots process or processes is used to facilitate the establishing of for actual physical face-to-face meetings between inviters and invites, and/or actual physical communication via voice and/or other actual means to physically communicate (such as telephone conferences, video conference and the like).

BRIEF DESCRIPTION OF THE DRAWINGS

FIG. 5 illustrates a flow chart illustrating the steps involved in creating a set of email invitations for an activity.

FIG. 6 depicts a flow chart illustrating the steps involved for an invitee to respond to an email invitation to schedule an appointment with the inviter.

FIG. 7 depicts an appointment invitation email with an embedded user-definable "Click To Schedule" button.

DETAILED DESCRIPTION OF THE DISCLOSED EMBODIMENTS

Figure 1:
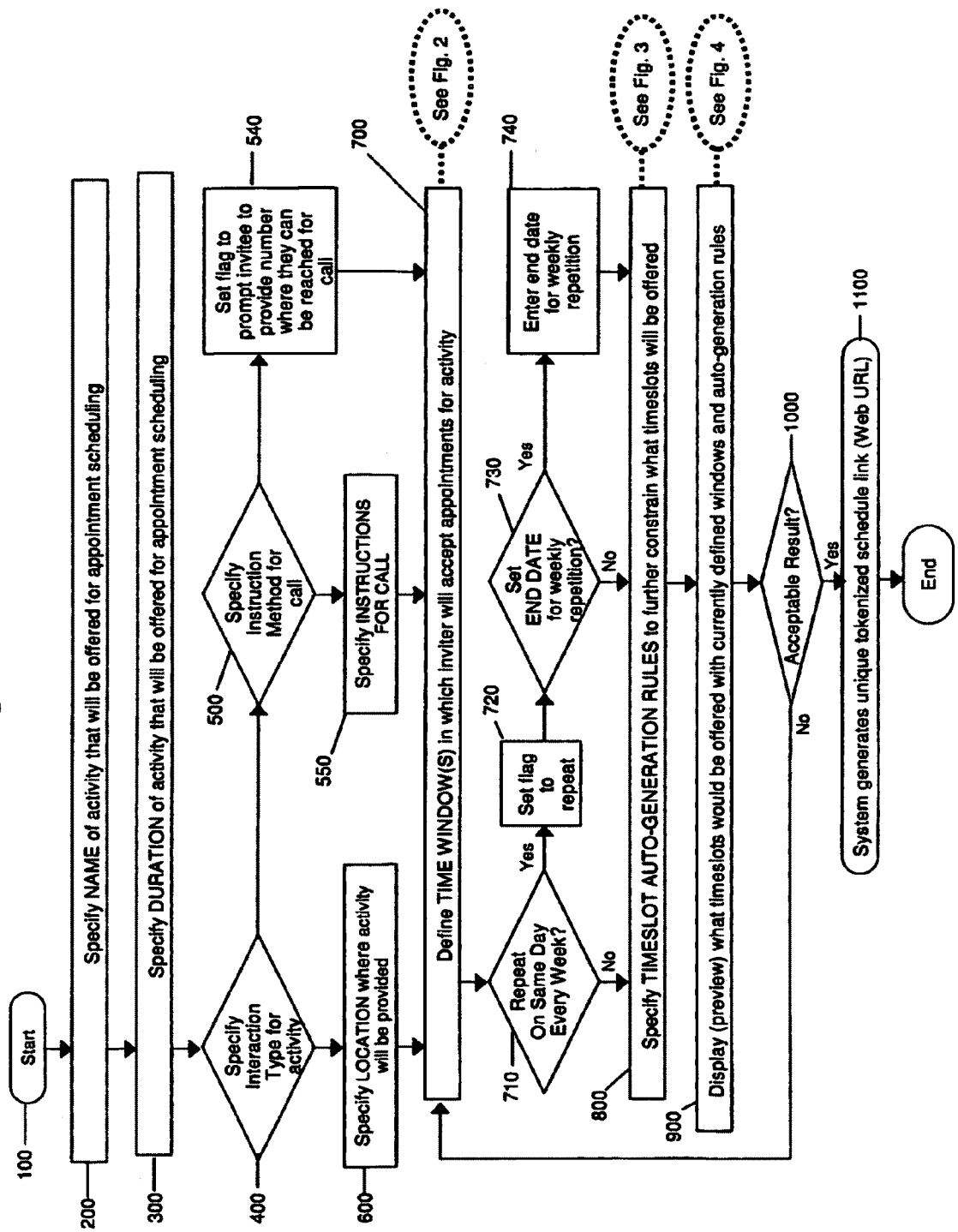
FIG. 1 depicts a flow chart illustrating the steps involved for an inviter to define an activity that will be offered to one or more invitees for appointment scheduling, and to define rules that enable the auto-generation of available timeslots. Upon completion of said steps, the system generates a unique tokenized schedule link (Web URL) where invitees can schedule an appointment for the activity.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention, such as windows involving visual interfaces of different colors, shapes, features and with various combinations of component layouts.

Presently, there are no appointment scheduling methods or systems that utilize the approach put forth by the present invention. Some previous approaches allow invitees to view available appointments over the web, and may allow inviters to announce to invitees that they are free to schedule appointments, but they fail to provide a more proactive inviter approach to encourage invitees to actually schedule an appointment that more strongly assists to facilitate the scheduling of actual physical face-to-face meetings between inviters and invites, and/or actual physical communication via voice and/or other actual means to physically communicate (such as telephone conferences, video conference and the like). Further, these previous attempts fail to offer a comprehensive means for inviters to create predefined activities with an associated schedule link (URL) where invitees can schedule themselves. Also, the previous attempts do not provide a means for a user to apply defined available times for appointments to days, months or years into the future. In addition, the previous attempts lack the ability to track an invitee from the point of notification reception through the steps when he/she schedules an appointment for an actual physical face-to-face meeting.

The present invention solves all of these shortcomings by introducing a web-based appointment scheduling visual interface, which allows a user to utilize the interface features by following a step-by-step "wizard" system that explains and prompts users to enter the settings that they prefer. This step-by-step approach applies to inviters that wish to define activities and define available timeslots for appointments and applies to invitees that wish to make an appointment in an available timeslot defined by an inviter. In addition, as part of the inviter step-by-step approach, inviters may quickly and easily define any activity that they may wish to invite invitees to make an appointment, and define available times for those activities (which allow for the option to recursively apply those available times for any length of specified time). Further, this invention emphasizes a proactive inviter approach to obtaining appointments by providing inviters the ability to embed a "Click To Schedule" button within an email, rather then simply requesting in a correspondence (email or otherwise) for invitees to visit a site and sign up for an appointment or contacting the office for an appointment. Expanding on the embedded "Click To Schedule" button feature, this invention provides the ability to track a user once they hit the "Click To Schedule" button by assigning a token to that user and updating the status for that user as the user signs up for an activity for which they were invited.

FIG. 1 illustrates the steps involved for an inviter to first define an activity to be offered to invitees for the scheduling of physical face-to-face meetings between inviters and invites, and/or other actual physical communication, wherein these steps include the defining of rules to enable auto-generation of available timeslots. The start block 100 represents an initial point where an inviter has already gone to the appropriate website to log into the system using a personal login and password and has entered an activity creation wizard. Once inside the wizard the inviter is prompted to perform the specify-activity-name step 200 for the activity that they plan to offer for appointment scheduling. Note that this specify-activity-name step 200 allows an inviter to define a completely new activity, or to select and modify a previously defined activity.

A companion step to specifying an activity name 200 is the specify-activity-duration step 300, in which the inviter may select an appropriate length of time for a scheduled appointment for the selected activity during a physical face-to-face or physical communication meeting. The specify-activity-duration step 300 allows for an inviter to either pick from a predefined list comprised of minutes or hours and hours and minutes or by allowing the user to enter the amount of exact time they wish. A further companion step comprises the specify interaction type step 400, in which an inviter chooses to specify if the activity being defined will be one that accepts physical in-person appointments, actual physical telephone appointments, or both. If telephone appointments are allowed then the inviter will be prompted to follow the specify-call-method step 500 which allows an inviter to select whether an inviter provides invitees with a number to contact her directly, and therefore provides said telephone number 550, or to prompt invitees to provide a telephone number by which the inviter may contact the invitees 540.

Figure 2:
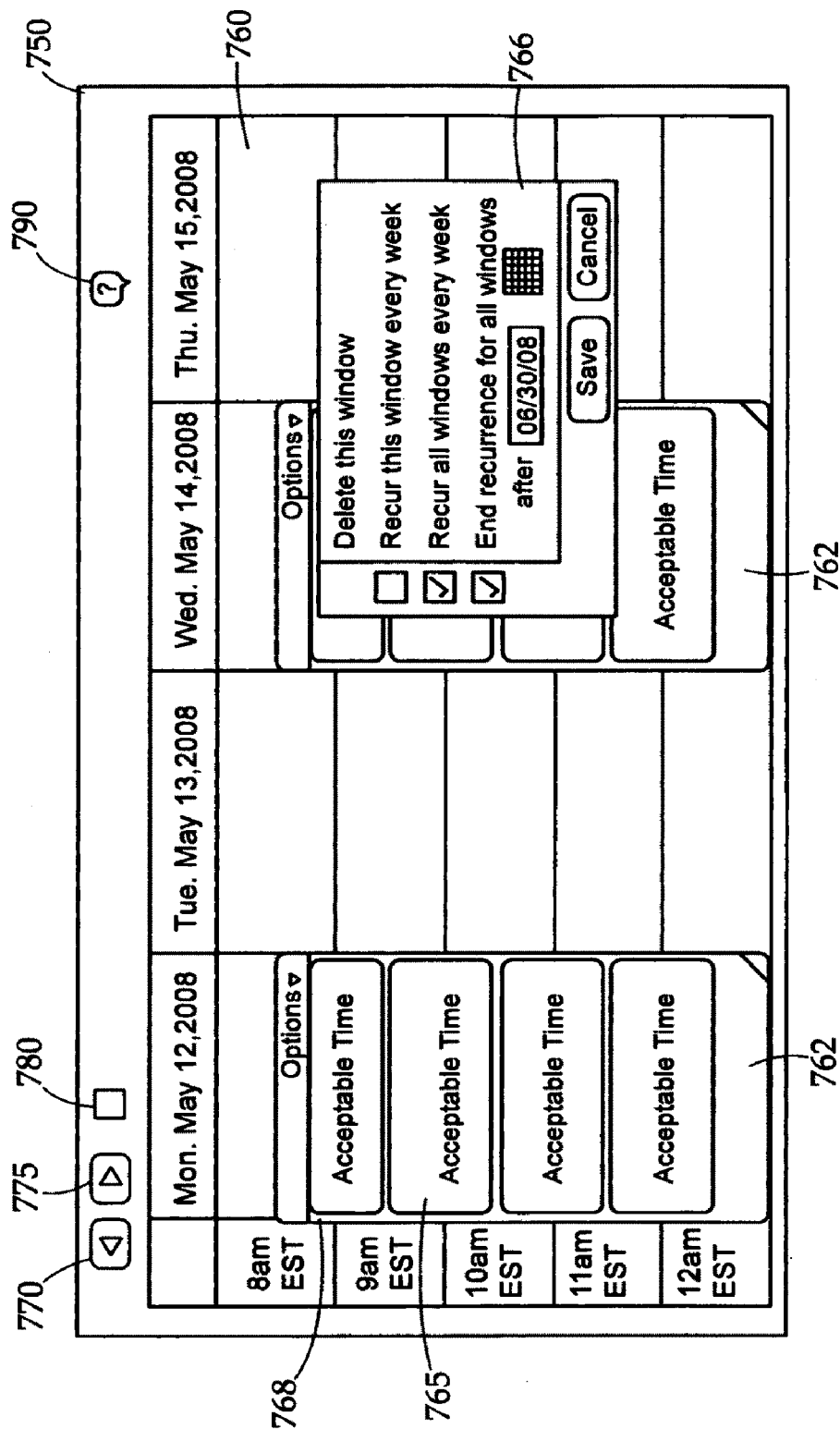
FIG. 2 depicts a segment of a window of the web-based visual user interface in which an inviter defines time windows in which he/she will accept appointments for a previously defined activity. Later, when an invitee seeks to schedule an appointment for the activity, the system will offer timeslots that fall within these windows, as further constrained by timeslot auto-generation rules defined in FIG. 3, and as further constrained by the inviter's then-current free/busy status cross-referenced from the inviter's primary calendar.

Once an activity has been defined, an inviter will be prompted to perform the define-time-windows step 700 in which an inviter defines windows in which he/she is willing to accept appointments for the defined activity (where the defined activity comprises an actual physical meeting or physical communication). FIG. 2 illustrates the visual interface for the time definition window 750 as comprising a back button 770 to allow a user to browse backward in time on the visual interface calendar 760, as well as a forward button 775 that allows a user to browse forward in time. The time definition window 750 is further comprised of a series of inviter defined time windows 762 in which the inviter is willing to accept appointments. Within each window, the systems automatically displays specific acceptable timeslots 765, and provides options 766 by which the inviter can recur or delete each time window 762. The time windows 762 may be defined by the method of entering in a time in the prompted window, or by clicking and dragging on the visual interface calendar display 760. An additional user feature in the time definition window 750 is the preview times check box 780 with which the user may turn on or off the visual depiction of the affect of "busy times" located elsewhere in the "primary electronic calendar" of the user. These "busy times" comprising previously defined appointments, scheduled appointments, previously defined reserved times, or other previously defined times that an inviter designated as unavailable for appointment scheduling. Also, for further definition, the primary electronic calendar being searched for busy times refers to the electronic calendar selected by the user as their default calendar (such as a Google calendar or an Outlook calendar). Another feature of the time definition window 750 is the question button 790 which the user may click upon or otherwise select to get access to additional helpful information.

Figure 3:
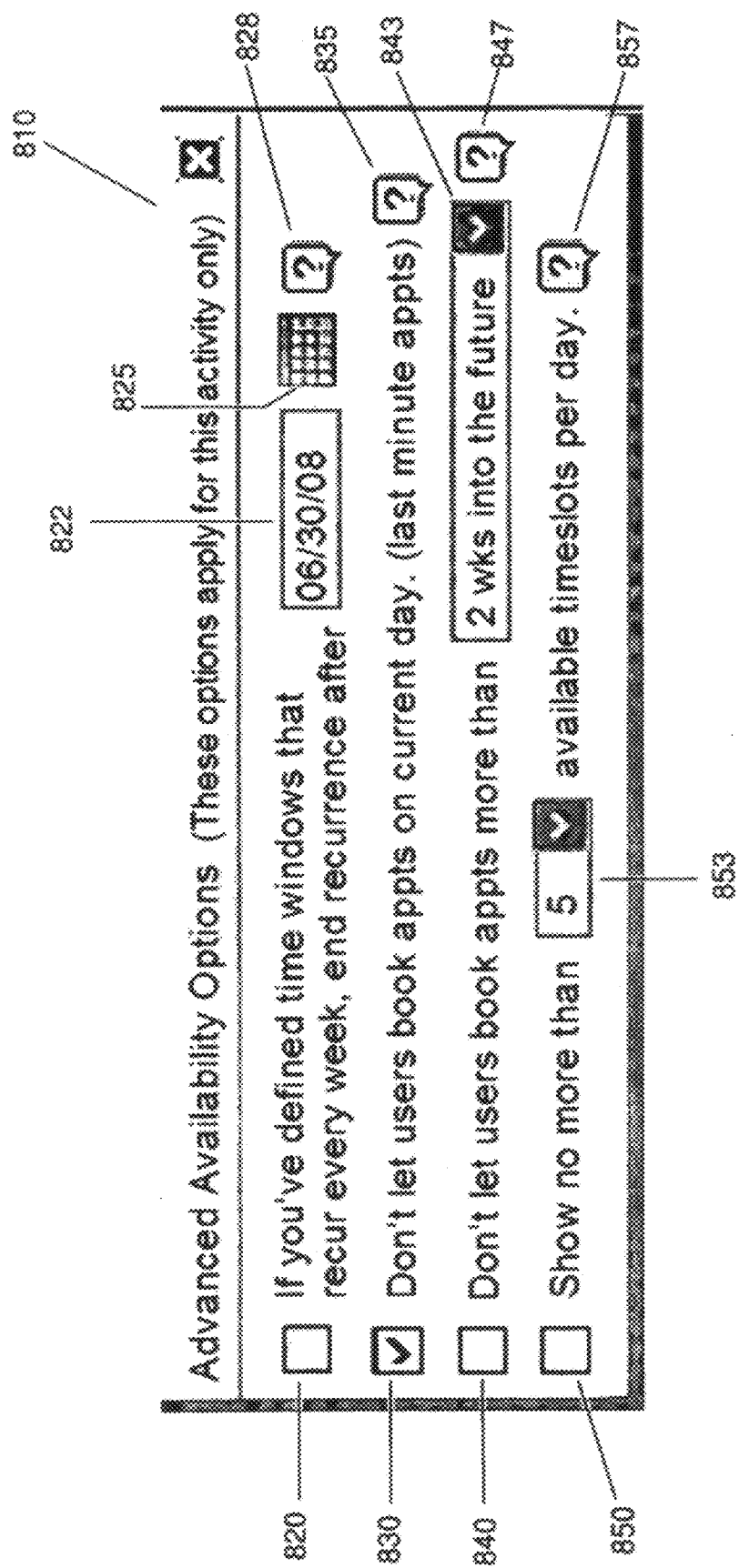
FIG. 3 depicts a window of the web-based visual user interface in which an inviter defines timeslot auto-generation rules that further constrain what timeslots will be offered.

As illustrated in FIGS. 1-3, once a time window 762 is defined within the time definition window 750, an inviter may then decide to repeat any given time definition window 762 defined by a user on that day for successive weeks 710 within the visual interface calendar 760 or to not repeat the windows. Should an inviter decide to repeat that window for successive weeks they will then set the repeat window flag 720 (via a checkbox or other similar on/off selection mechanism) and then decide if they wish to set an end date for the time window repetition 730 by setting a flag (checkbox 820, or other similar selection mechanism) that indicates the inviter wishes to specify a repetition end date 740 by entering in the specified date in an input box 822 or selecting a date from a date-selection calendar 825 or by the use of some other input mechanism. Note that FIG. 2 further illustrates that some of the recurrence options as seen FIG. 3 can also be accessed by right clicking on any time window 762 and thus gaining access to a time window options menu 766. It should also be noted that were no end date selected for the end of the recurrence window, then the times selected by the user will, in theory, recur with no end.

As further illustrated in FIGS. 1-3, after determining the number of weeks, if any, that a time window 762 may repeat, the user then may add additional constraints on what timeslots will be offered by specifying timeslot auto-generation rules 800. This selection process may be accomplished by a user interface as the one shown in FIG. 3, which illustrates an advanced availability options window 810. This embodiment of an advanced availability options window 810 comprises an end-recurrence check box 820, a time window 762 end-recurrence date input box 822, a time window 762 end-recurrence date selection calendar 825 and a time window 762 end-recurrence question button (for providing help information about recurrence ending). This mentioned embodiment of the advanced availability options window 810 is further comprised of a "don't let users book appts on current day" check box 830 that when selected prevents appointments from being allowed for the current calendar day for which an invitee may attempt to schedule an appointment (in this way the instant invention allows for inviters to prevent themselves from receiving surprise appointments). This "don't let users book appts on current day" check box 830 also has its own companion question button 835 to inform the user of the function and use of the "don't let users book appts on current day" check box 830.

Other important features of the instant embodiment of the advanced availability options window 810 in FIG. 3 further comprise a "don't let users book appts more than N weeks into the future" check box 840, a drop down list 843 associated with said check box, wherein when said check box 840 is selected the inviter may select a number of weeks into the future beyond which invitees will not be allowed to book appointments by making said selection within a dropdown box 843. However, this feature that allows the scheduling of appointments for actual physical face-to-face or actual physical communication meetings on a certain date into the future is such that it is not simply a static two weeks into the future that will be allowed. When a user selects a number of weeks into the future beyond which the invitees will not be allowed book appointments from the dropdown box 843, this time window rolls forward daily. Thus, if an inviter selects to allow appointments for only two weeks into the future, then this period will always remain exactly two weeks into the future, never a day more or less. Further, this rolling window will continue until the time period specified for this activity associated with the end-recurrence check box 820 has been reached. If the option of the end-recurrence check box 820 has not been defined, then this rolling window of allowing appointments into the future will also continue indefinitely into the future. In addition, said check box 840 and said drop down list 843 also have a companion question button 847 explaining the use and function of said check box 840 and said drop down list 843. In addition the instant embodiment of the advanced availability options window further comprises a checkbox 850, a dropdown list 853 and a question button 857, in which when said checkbox 850 is selected, an inviter may select a maximum number of timeslots they wish to offer per day from said dropdown list 853. The question button 857 provides information on the use and function of the above mentioned checkbox 850 and the dropdown list 853. Lastly, regarding the nature of the time windows 762 is that, even if the time windows are not displayed, the system itself does in fact generate the windows up to the date specified to end the recurrence (the date selected in the end-recurrence date input box 822).

Figure 4:
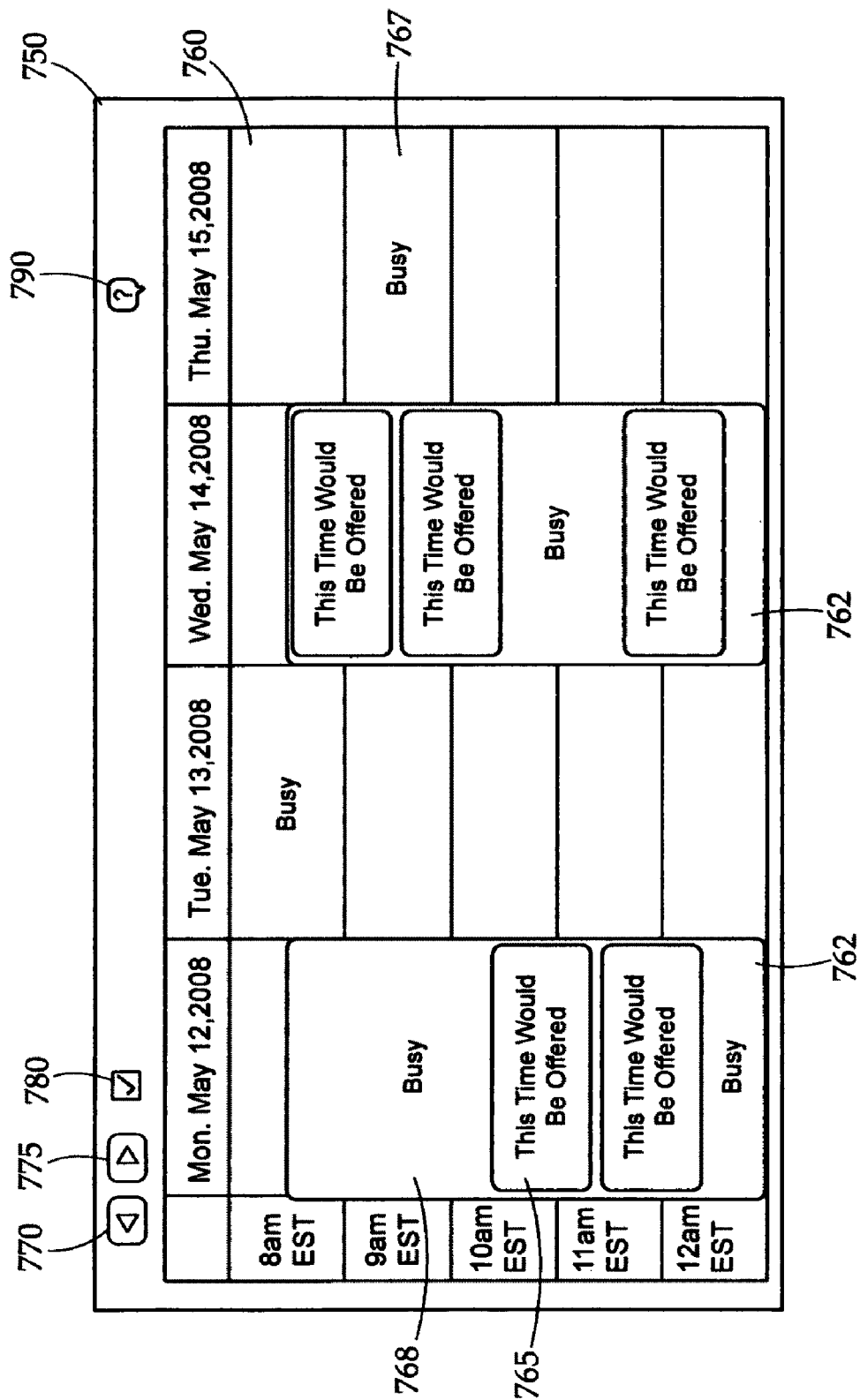
FIG. 4 depicts a window of the web-based visual user interface in which an inviter may preview which timeslots would be offered with currently defined time windows, free/busy status, and previously selected auto-generation rules.

Upon fully selecting which timeslot auto-generation rules to apply and how to apply them 800 from an advanced availability options window 810, or other option selecting mechanism, an inviter may then review the resulting available free and busy timeslots, generated by reviewing in a preview display 900. FIG. 4 illustrates the resulting busy areas 768 and offerable timeslots 765 within a time window 762, for the defined user activity, within the visual interface calendar 760 (which also may illustrate busy areas 767 not within a time window 762). FIG. 4 also illustrates the previously described visual interface calendar features described in FIG. 2, including the back button 770, forward button 775 and question button 790. However, the preview checkbox 780 that was also seen in FIG. 2 is now selected in FIG. 4, to illustrate the visual effect that selecting the checkbox 780 has upon the visual interface calendar 760. This visual effect is demonstrated by comparing the view of FIG. 2, where the preview checkbox 780 is not selected, and the view of FIG. 4, where the preview checkbox 780 has been selected. FIG. 2 displays only acceptable timeslots within a time window 764 where the preview checkbox 780 is not selected, while FIG. 4 displays grayed-out areas within the visual interface calendar 760 (both within and outside of time windows 764) where the preview checkbox 780 is selected.

Further steps illustrated in FIG. 1 include an inviter deciding if she is satisfied with the results 1000. If the results are satisfactory, the inviter may simply accept the results and exit the activity creation wizard, upon which the system will create unique tokenized schedule link (Web URL) where invitees can schedule an appointment for the activity.

Figure 1A:
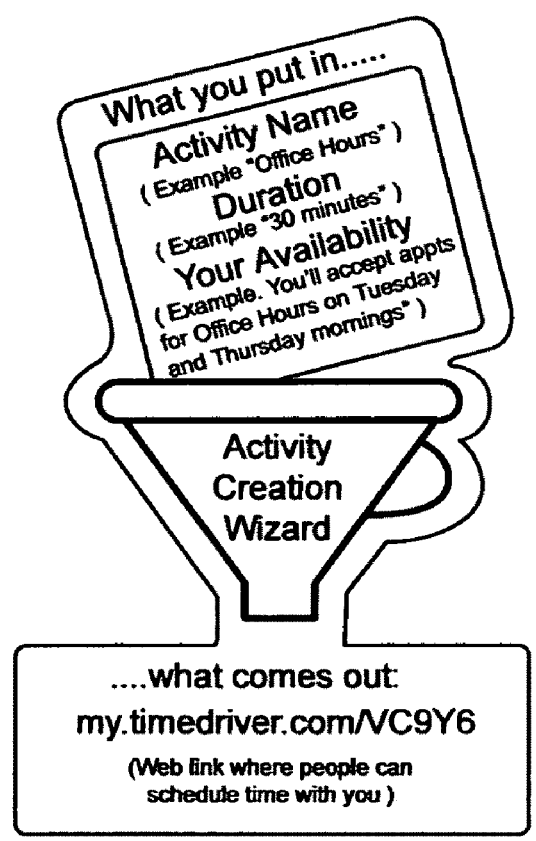
FIG. 1a is a simplified version of FIG. 1.

However, should the inviter not be satisfied while previewing the results 900 after the timeslot auto-generation rules have been defined 800, the inviter may return to the time windows step 700, by returning to the advanced availability options window 810 and impose different options and parameters available in this window, to better fit the inviters needs. Upon completion of reselecting different options and parameters, the inviter again may preview the results of the newly selected options and parameters 900 as illustrated in FIG. 4, and then again decide if the results are acceptable or not acceptable 1000. If again upon finding unsatisfactory results the inviter may again return to the step of defining time windows 700, again resetting the options and parameters 800, again previewing the results 900 and deciding if these results are now acceptable 1000. This sequence of steps may again repeat until the point when the user decides that the result is acceptable and exits the wizard 1100. A simplified version of the process illustrated in FIG. 1 is illustrated in FIG. 1a.

Figure 1B:
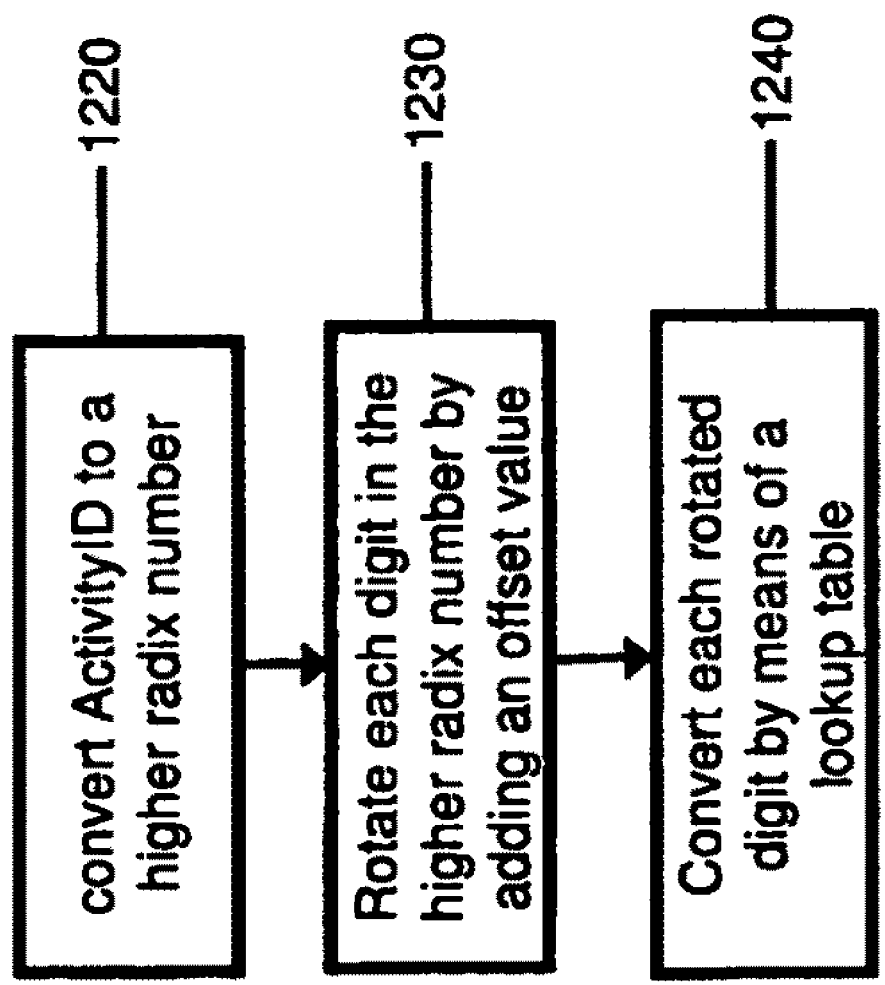
FIG. 1b depicts the method by which the system creates a URL Token that is embedded by the system as an element within the unique tokenized schedule link (Web URL).

FIG. 1b depicts the method by which the system creates a URLToken that is embedded by the system as an element within the unique tokenized schedule link (Web URL). The URLToken is an encoded representation of the integer ActivityID, wherein the encoding comprises random-looking non-sequential attributes, and allows for much higher number of activities to be represented within an easy-to-type five character number than a more standard representation of an integer ActivityID would allow. The method relies on conversion of the radix 10 ActivityID to a higher radix such as radix 30 as employed in the present embodiment. The first step in the method employed by the system is to convert the activityID (a decimal integer with radix 10) to a number represented with a higher radix 1220. Next, to provide an illusion of randomness, each digit in the higher radix number is "rotated" by adding an integer value. The rotation value applied by the system can be any integer, such as the least significant digit in the higher radix number as employed in the present embodiment. For example, if the least significant digit were 5, the converted value of the digit subject to rotation would be its initial value plus 5. The final step employed by the system to provide an illusion of randomness is to convert each rotated digit to a new value by mapping each rotated digit through one of several lookup tables where the values in each table are arranged in random order. For example, with six lookup tables as in the present embodiment, each rotated digit is converted to a mapped digit by applying one of the six lookup tables to each digit. The tables can be applied in any order, such as cycling through the tables one after another as in the present embodiment.

Figure 5A:
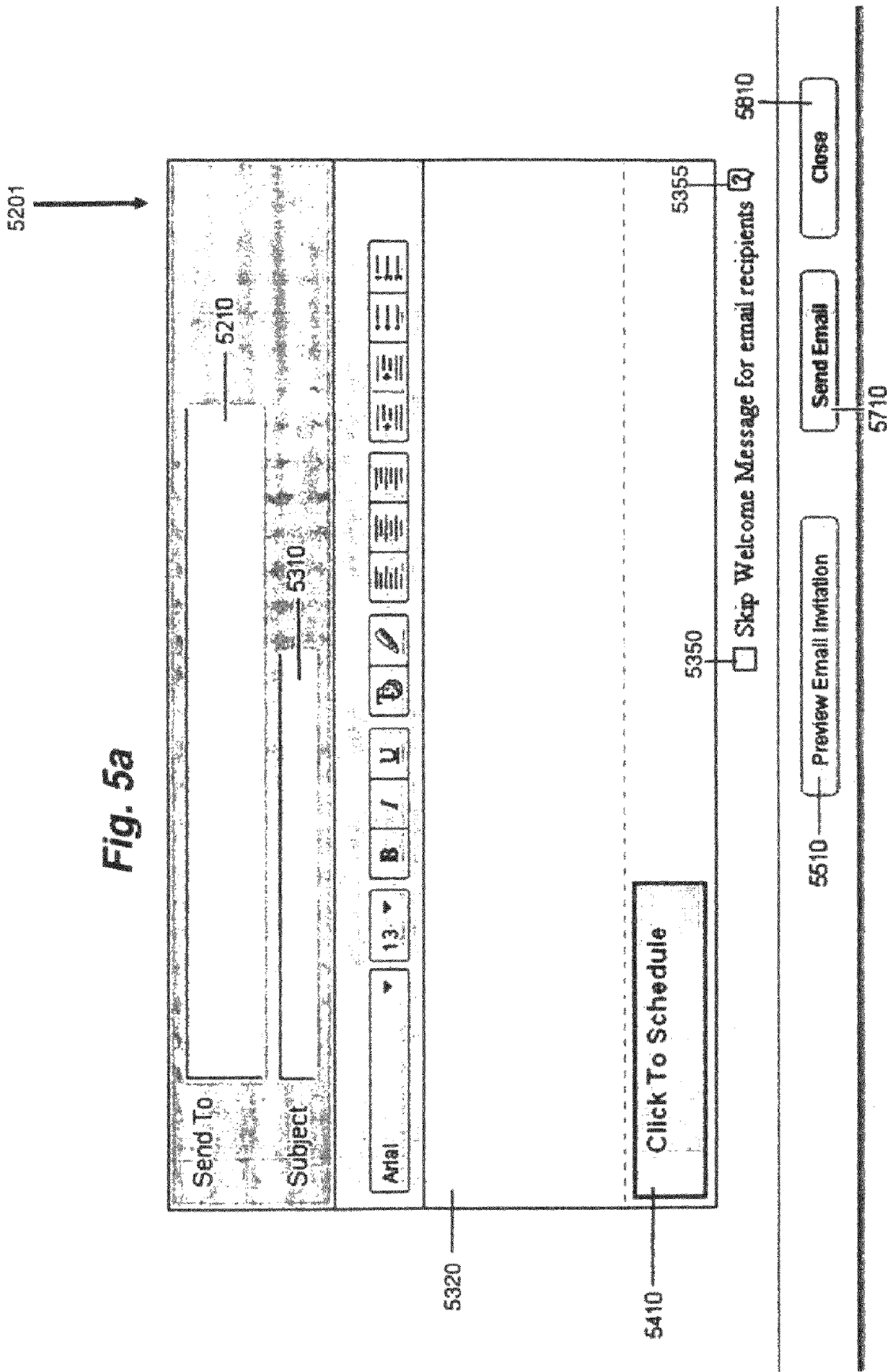
FIG. 5a illustrates a window of the web-based visual user interface in which an inviter may draft and edit said inviter's email invitations for an activity.
Figure 5B:
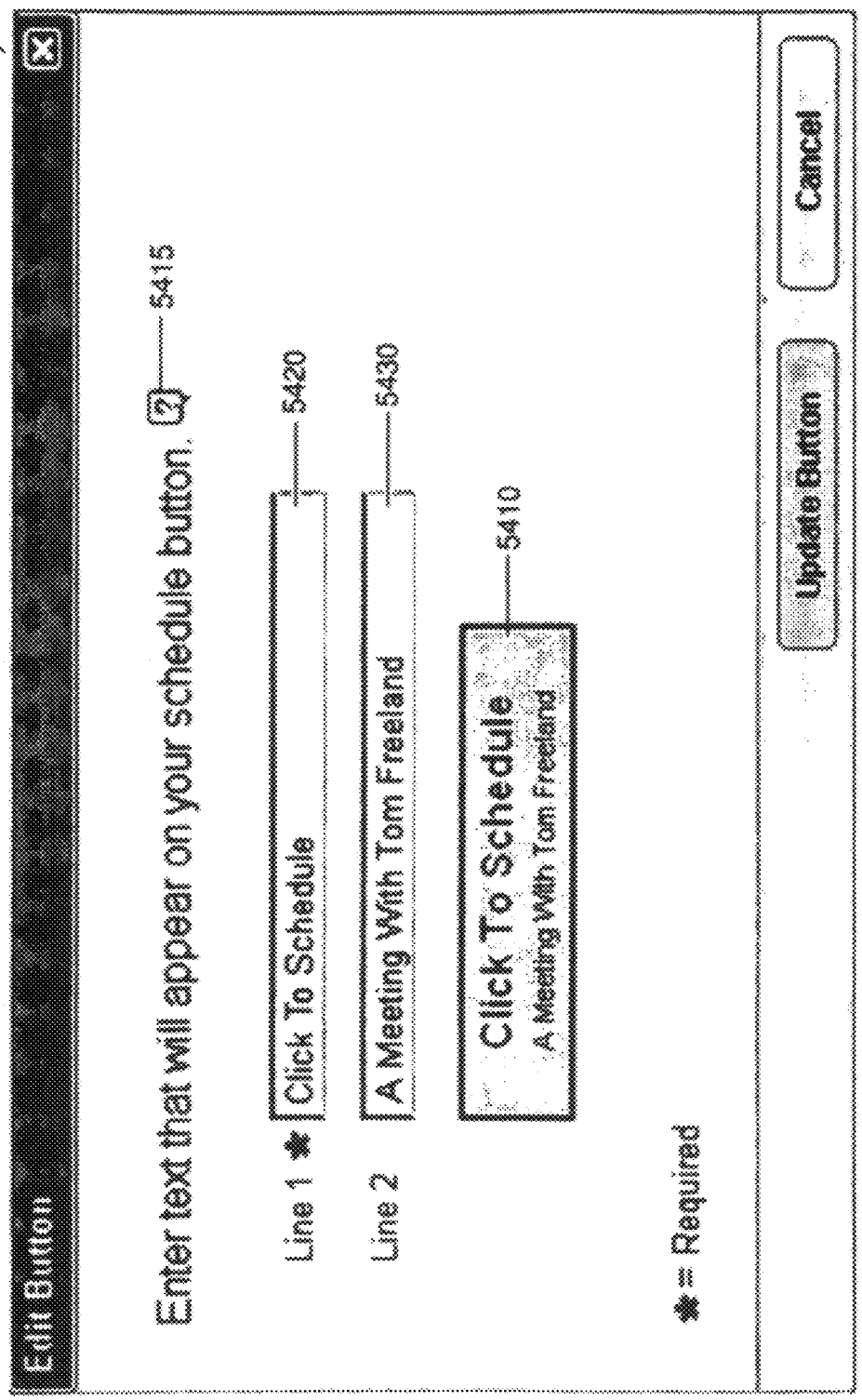
FIG. 5b illustrates a window of the web-based visual user interface in which an inviter may customize the Click-to-Schedule button in the email invitations said inviter is preparing.

Once an activity has been defined, an inviter may opt to perform a step necessary to create email invitations for the activity, and define a click-to-schedule button that will be embedded into the body of outgoing emails. FIGS. 5-5b illustrate these steps and the user interactive components involved in this process. First, the inviter activates the user interface indicating that they wish to send email invitations to invitees 5000. Next, from a list of defined activities included for physical face-to-face or physical communication meetings, the user selects one defined activity 5100, thereby indicating that this activity will be the activity for which appointment invitations will be sent out to invitees. This last step of selecting a defined activity 5100 is followed by the invitee entering invitee email addresses of recipients into the send to box 5210 of a user email invitation interface 5201 ADDED 5201 TO FIG. 5A. After entering the list of invitees' email addresses into the send box 5210 the inviter enters in the subject line and text information 5300 into the subject bar input box 5310 and text body input box 5320.

Upon entering in the list of invitee email addresses 5200, and subject matter information 5320 the inviter may then customize the message that the invitees will view in the outgoing email invitations 'click-to-schedule' button 5400. As illustrated in FIG. 5b, the inviter enters in the text of the first line and second lines of the message to be displayed in the 'click-to-schedule' button 5410 in their respective line 1 text box 5420 and line 2 box 5430. Also illustrated in FIG. 5b are a help information button 5415 and a preview image of the 'click-to-schedule' 5410 button as it will appear in the outgoing invitee emails.

After customizing the text of the 'click-to-schedule' button 5410, the inviter will be prompted to preview the appearance of the outgoing email invitations 5500, to accept or reject the results 5600 and if deemed acceptable, send the results to the selected invitees 5700. However, should the inviter decided that the appearance of the outgoing email invitations are unacceptable, the user may reject the results and return to the subject matter input phase for the outgoing email invitation subject line input box 5310 and the text body input box 5320. Thereafter, the inviter may again customize the 'click-to-schedule' button 5400, 5410, preview the appearance of the outgoing email invitations 5500, and accept or reject the results 5600. The cycle of rejecting the results and returning to reenter and customize the outgoing invitation emails will continue until the inviter accepts the results, and clicks a button 5710 to send the outgoing email invitations 5700 and ends the session 5800. This action causes the system to send a personalized invitation 2210 (see FIG. 7) to each invitee with an embedded click-to-schedule button 2220 which, when clicked by the invitee, invokes a URL link with a unique Access Token associated with the invitee, 3000 (see FIG. 9).

FIG. 6 illustrates the steps involved when an invitee responds to an email invitation to schedule an appointment for an inviter-defined activity. The initial step 2100 involves receiving, opening and reading the offer to schedule an appointment by an invitee. The immediate next step involves the user clicking or selecting a link or button to respond to the offer 2200. In the current embodiment of the instant invention this is illustrated in FIG. 7 by an invitee clicking on the "schedule now button" 2220 of the sample appointment invitation email 2210. Upon an affirmative response to scheduling an appointment 2200 (by clicking on a "schedule now button" 2220 or other similar method), the invitee is redirected to an appropriate appointment transaction web page 2300 illustrated in FIG. 7. The redirection is accomplished by means of a URL link associated with the "schedule now button" with a unique Access Token that serves as an index key to the appropriate invitee for the invited activity.

Figure 10:
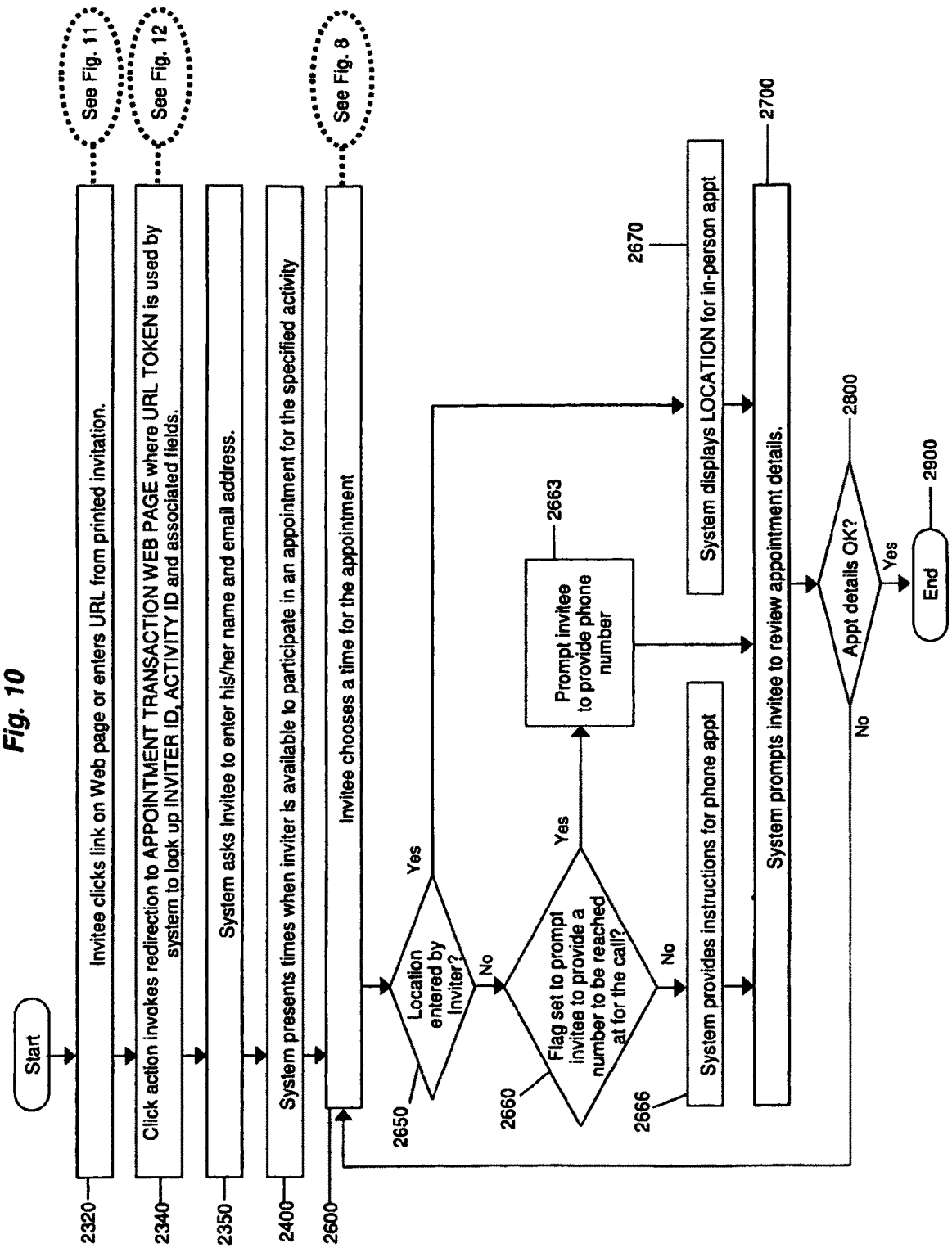
FIG. 10 illustrates the steps used when an invitee responds to a non-email invitation from an inviter. Note that several of the steps are substantially similar to those of FIG. 5 as both use the same appointment selection and verification process.
Figure 11:
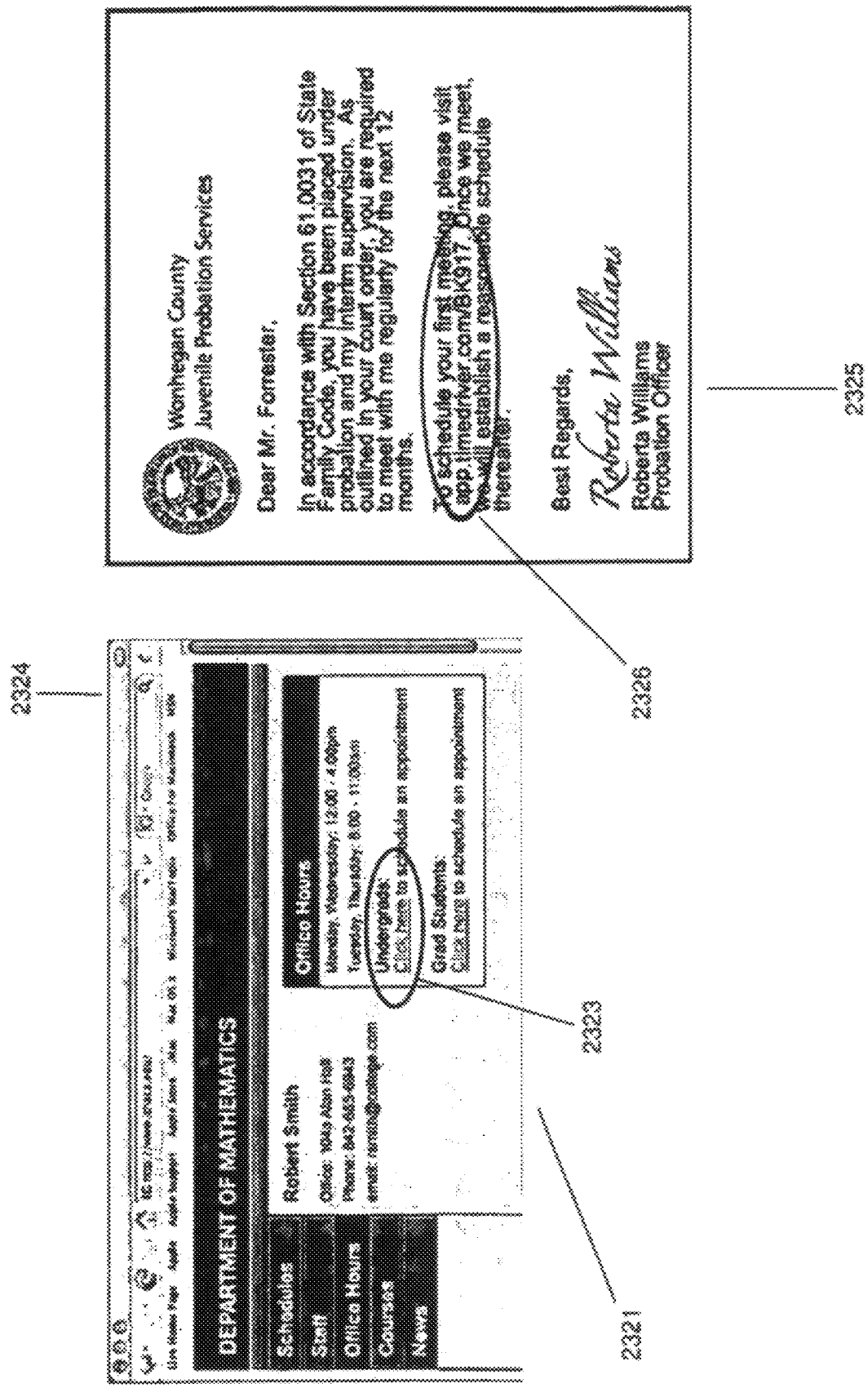
FIG. 11 illustrates a non-email appointment invitation through an active URL link from a web page or a static URL link from a printed invitation page.

FIG. 10 illustrates the steps involved when an invitee responds to a non-email invitation to schedule an appointment. Examples of such non-email invitations are illustrated in FIG. 11, whereby invitees can initiate a scheduling transactions by clicking on a link 2323 on a web page 2321 or by visiting a Uniform Resource Locator "URL" address 2326 conveyed in a printed invitation 2325.

When an invitee responds to a non-email invitation FIG. 10 2320 the click action invokes a redirection routine 2340 to the Appointment Transaction Web Page where the system prompts the invitee to enter their name and email address 2350, after which the system leads the inviter through a series of steps common to FIGS. 6 and 10. First, the system displays available timeslots for appointments for the specified activity 2400 for the user to select 2600. This is followed by the system performing a check if the inviter specified a location for the activity 2650 and then displaying any location information, should it exist 2670, and prompting an invitee for contact information 2663. In instances when no location information is provided by an inviter, the system checks if the inviter has chosen to prompt the invitee to provide the system (and ultimately the inviter) contact information 2660, in which case the system so prompts the invitee for said contact information 2663. However, in instances when the inviter has not chosen to prompt invitees for contact information the system displays instructions to the invitee to schedule a physically conducted telephone appointment 2666. After gathering and displaying the information required above, the system prompts the invitee to review the information provided 2700 and, to accept, and end the appointment scheduling process 2900, or returns the invitee to again choose an available appointment timeslot for the specified activity 2600. Here the process loops through the steps of selecting an appointment time 2600, checking for an inviter specified location 2650 and displays it 2670. Next, if necessary, the system prompts invitees to provide contact information 2663 or displaying to the invitee instructions for scheduling a telephone appointment 2666. Once again the information selected for the appointment will be displayed to the invitee for review 2700, at which point the loop continues again through the step of selecting an appointment time 2600 and the steps following the selecting an appointment step it until the acceptance of the information step 2800 is affirmatively answered and the invitee exits the appointment scheduling process 2900.

Figure 8:
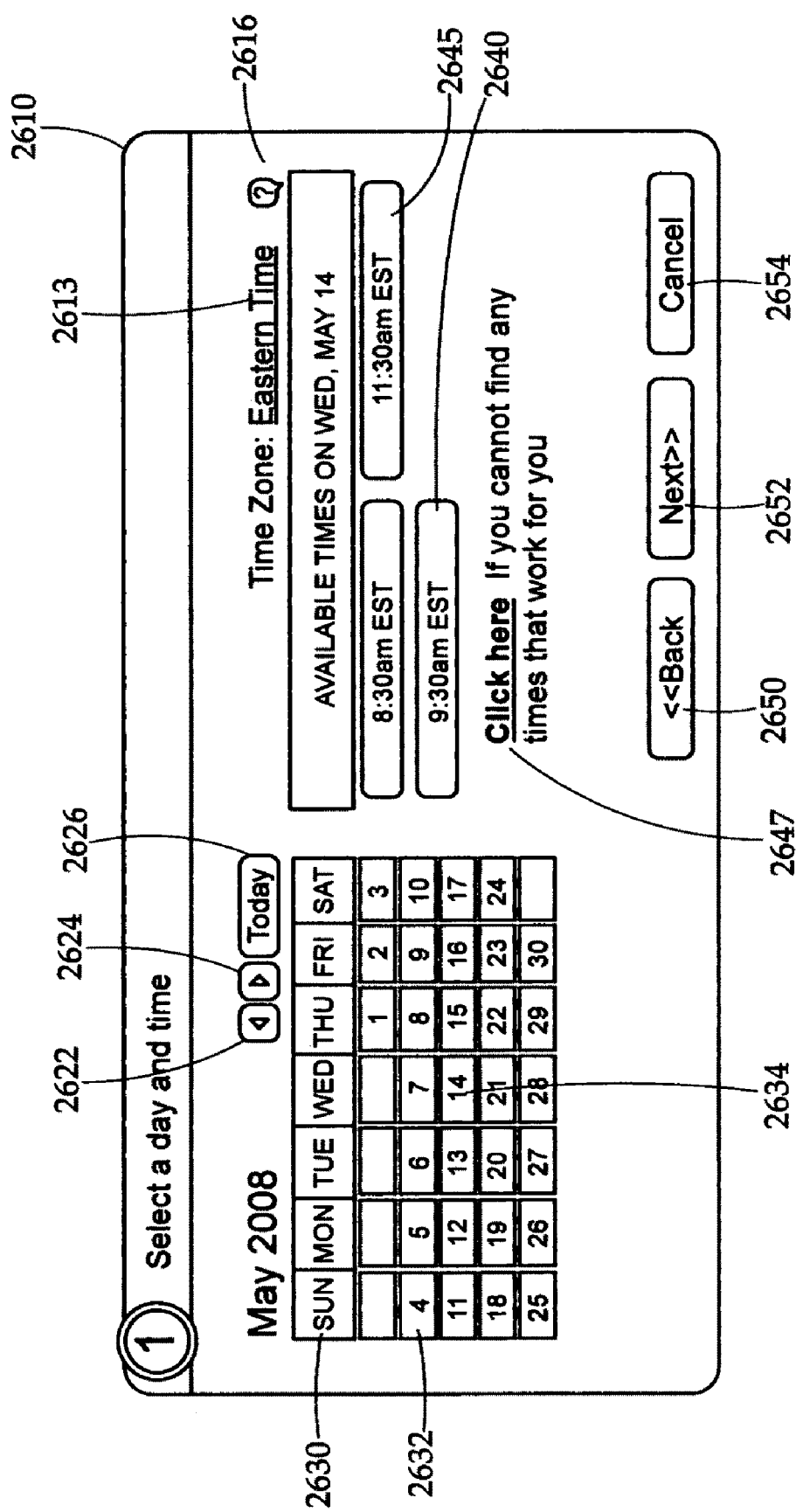
FIG. 8 depicts a window of the web-based visual user interface in which an invitee can review timeslots offered for a specified activity and can choose a specific timeslot for his/her appointment.

FIG. 8 illustrates the appointment transaction web page 2610, comprising various components to allow an invitee to select an appointment date. These components include, a set of date selection tools, including a back-one-month button 2622, a forward-one-month button 2625, a today button 2626, a date selection calendar 2630, itself comprised of individually selectable dates 2632. Using theses user interactive buttons, an invitee may navigate to an appropriate date, select the date, then see a list of available times 2640 for the selected date 2634, these times being displayed to the right of the calendar 2630 (note that the selected date 2634, becomes highlighted within the calendar 2630 to indicate that it is the currently selected date being viewed). From the list of available timeslots 2640 for the selected date 2634 the user may then select an available timeslot from said list 2640, which becomes marked as a selected timeslot for an appointment 2645 by being highlighted.

Also illustrated in FIG. 8 is a click here link 2547 that provides an invitee additional options should the invitee not be able to find an available time to schedule an appointment for the offered activity involving a physical face-to-face or physically initiated converence. Further shown in FIG. 8 is the "time zone" link 2613 that provides the ability to change selected time zones by selecting the link 2613. FIG. 8 also illustrates a question button 2616, whereby an invitee may get additional information about the appointment transaction web page 2610 by selecting the question button 2616. Additional features also illustrated in FIG. 8 are the standard back 2650, next 2652 and cancel 2654 buttons commonly found in most visual interface wizards.

Figure 9:
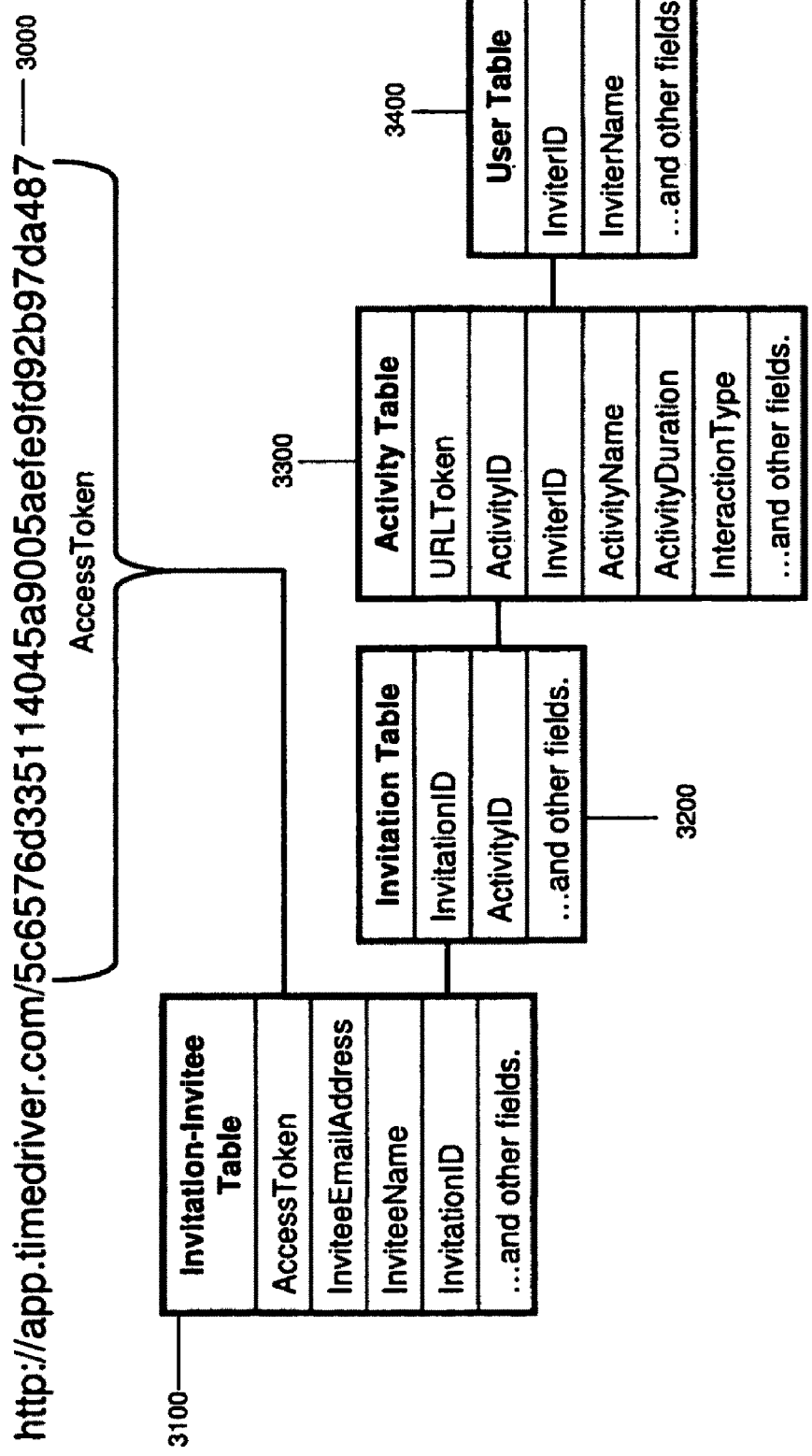
FIG. 9 illustrates the key structure for lookup of INVITER ID, ACTIVITY ID, INVITEE EMAIL ADDRESS and associated fields when ACCESS TOKEN parameter is passed to APPOINTMENT TRANSACTION WEB PAGE from auto-login URL.

FIG. 9 illustrates an access token 3000 and a representative data structure associated with it, specifically the 'inviter-invitee' data structure 3100 for email invitations. The inviter-invitee data structure 3100 is further comprised of other sub-data structures including the invitation data structure 3200, which comprises an activity data structure 3300, which in turn comprises a user data structure 3400. In FIG. 9, when a user clicks a click-to-schedule button in an email invitation, the access token 3000 becomes associated with the inviter-invitee data structure 3100 and its component data structures listed above.

Figure 12:
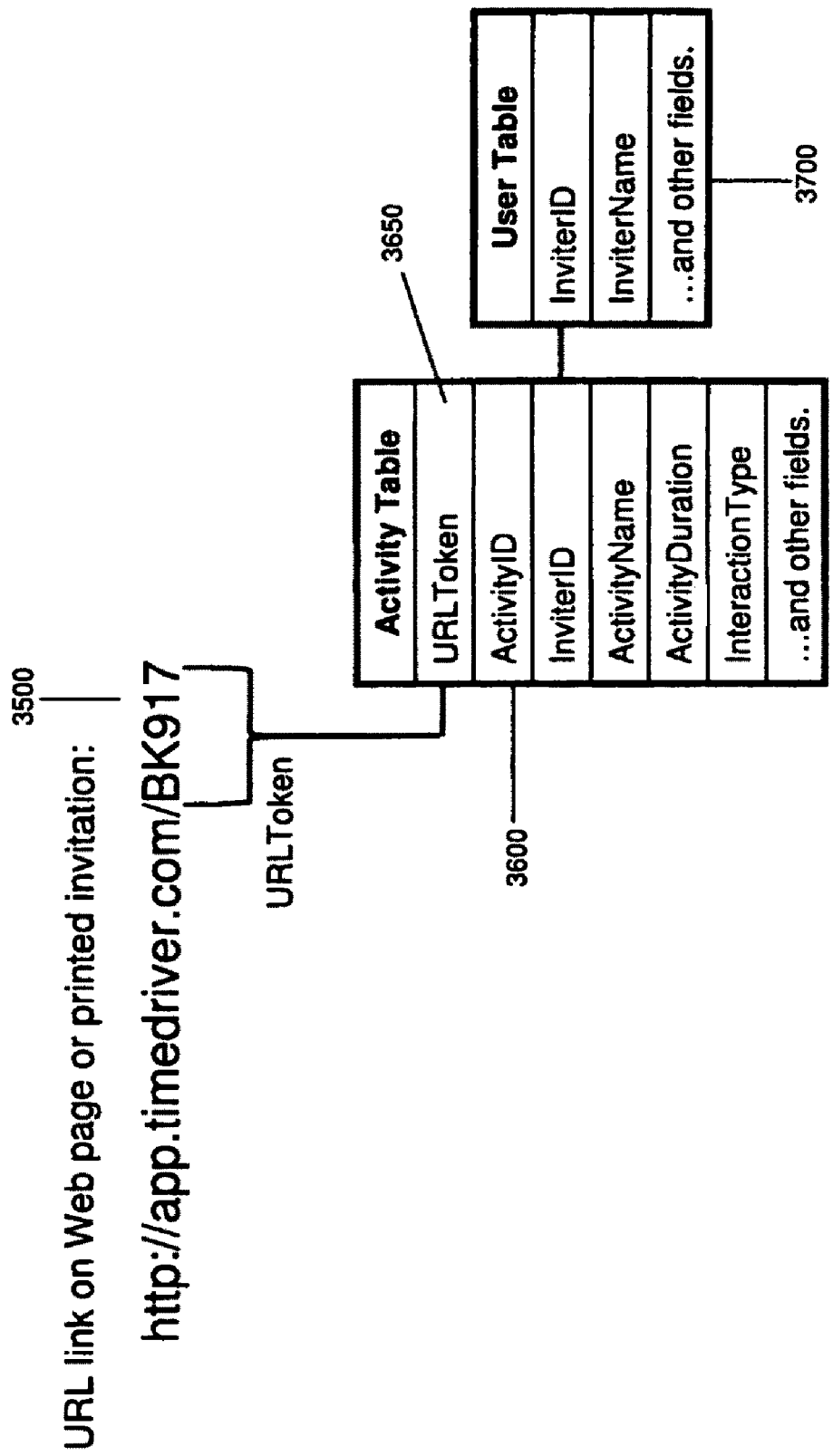
FIG. 12 illustrates the key structure for lookup of INVITER ID, ACTIVITY ID and associated fields when URL TOKEN parameter is passed to APPOINTMENT TRANSACTION WEB PAGE from URL on Web page or printed invitation.

FIG. 12 illustrates a URL Token 3500 and a representative data structure associated with it, specifically the 'activity-table' data structure 3600 for non-email invitations. The URL token 3500 is illustrated as a five character string for easy typing and workability. The five character sequence used in the URL token 3500 was arrived at by encoding the integer activity ID 3650. This encoding gives the URL token random-looking, non-sequential attributes and also allows for associating a much higher number of activities tokens versus using a direct representation of the Activity ID 3650.

Figure 13:
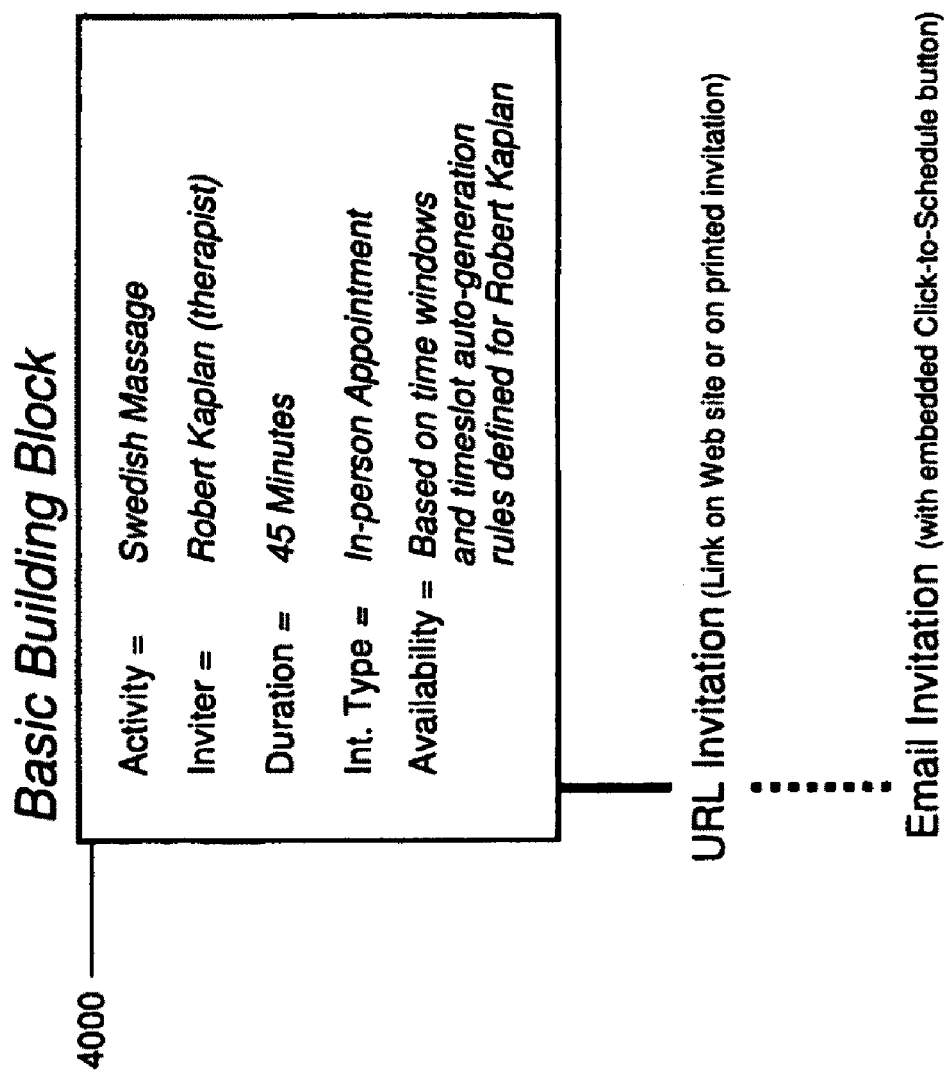
FIG. 13 illustrates the scheduling system basic building block object, representing the lowest level group of objects for which an invitation can be generated. This figure also illustrates common fields contained within said building block object.
Figure 14:
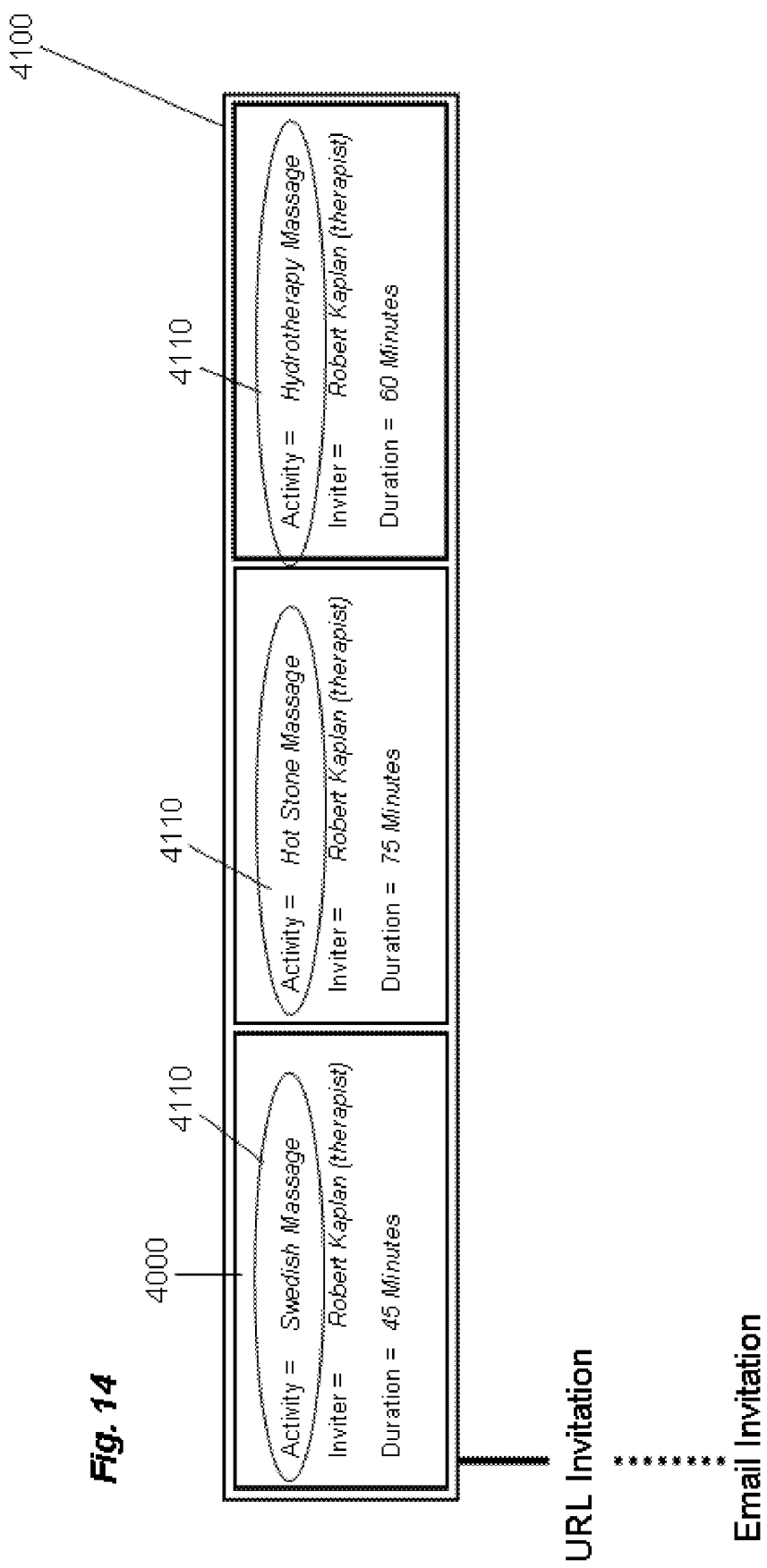
FIG. 14 illustrates the use of combing building block objects to create an invitation that presents a choice of activities that may be scheduled by the invitee.

FIGS. 13-15a represent the use of a building block approach for system configuration as a powerful and flexible tool for creating invitations that offer a choice of activities for physical face-to-face meetings or physically conducted meetings and a choice of inviters. FIG. 13 shows a single building block data structure 4000 for a specific activity, resource, duration and other properties required to publish a URL invitation or to send an email invitation. FIG. 14 shows how building blocks for a common inviter can be combined to create and Activity Group for which the inviter can publish a URL invitation or send an email invitation.

Figure 14A:
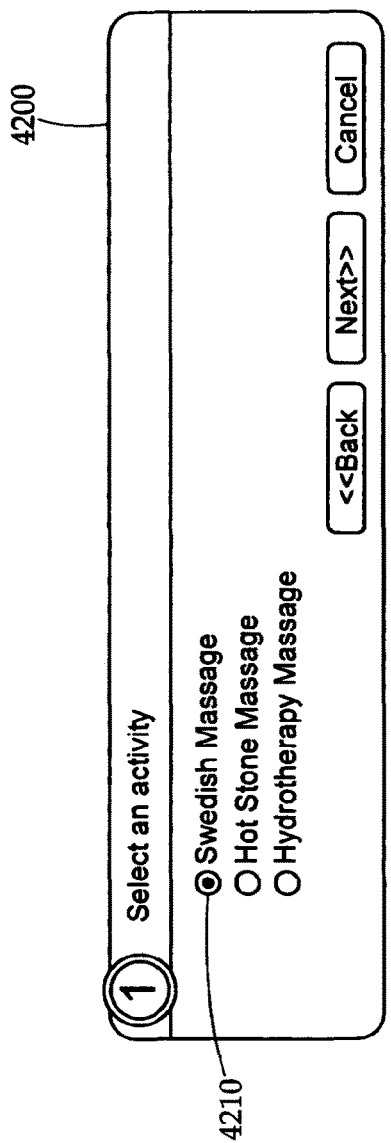
FIG. 14*a* illustrates a window of the web-based visual user interface in which an invitee may select which activity she is interested in when setting up an appointment. This figure illustrates the flexibility that results by using combined building block objects in selecting various combinations of data members associated with the building block objects used in selecting an invitation.

FIG. 14a illustrates a "select an activity" user interface window 4200 in which an invitee may select an individual activity data value 4210 associated with one of the different data fields 4110 in the various building block data structures 4000 of a set of building block data structures 4100. Upon selecting one of said activity data values 4210 and selecting the "next" button the system would then display a similar user interface window that prompts the invitee to select at date and time for the activity previously selected (note that the duration field of the building block data structures 4000 contained in said set of building block data structures 4100 also had multiple data 4210 values contained in this set, thus alerting the system that the invitee would need to specify this information as well).

Figure 15:
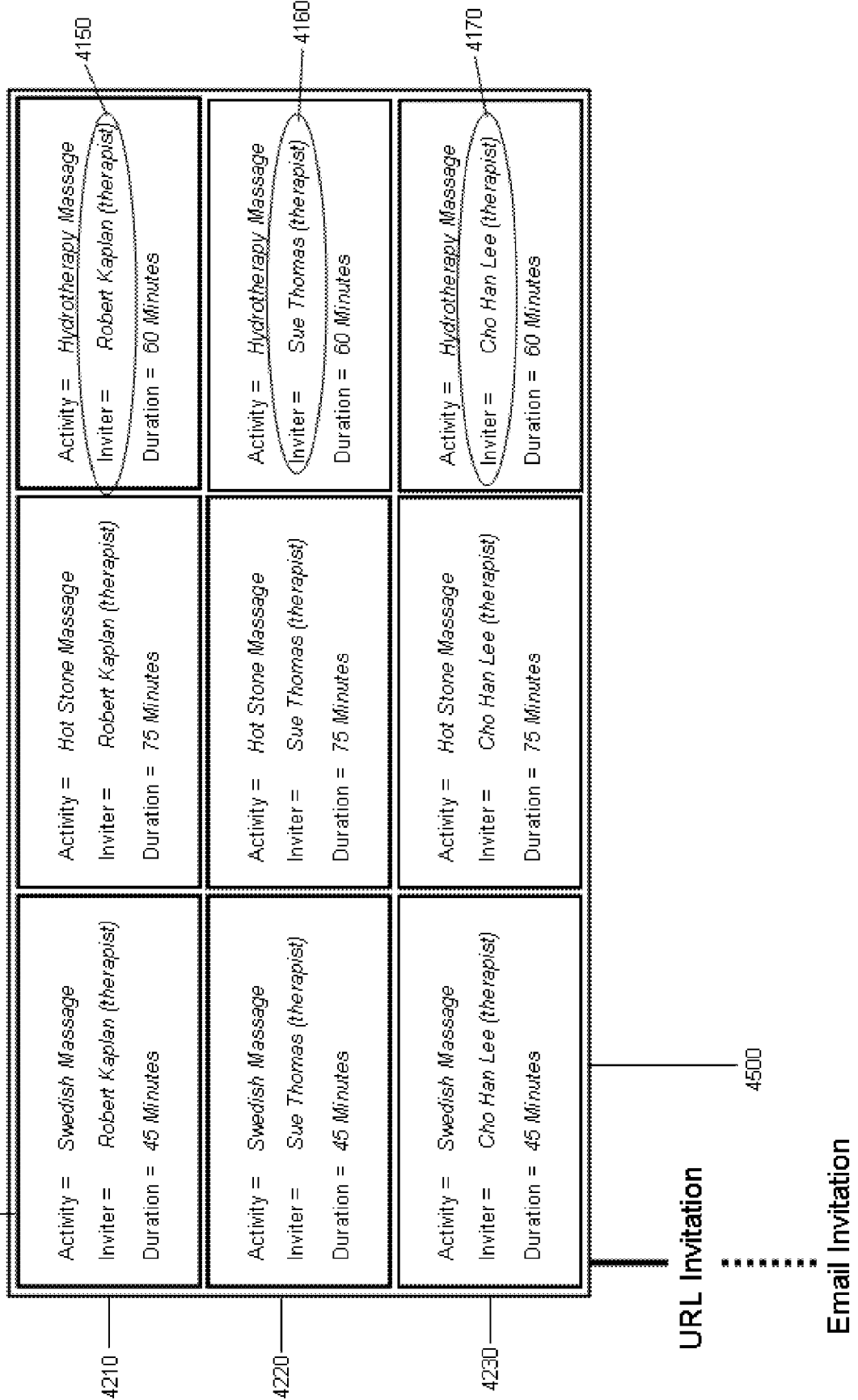
FIG. 15 illustrates the use of combining building block objects to create an invitation that presents a choice of activities and a choice of inviters (service providers) to the invitee.
Figure 15A:
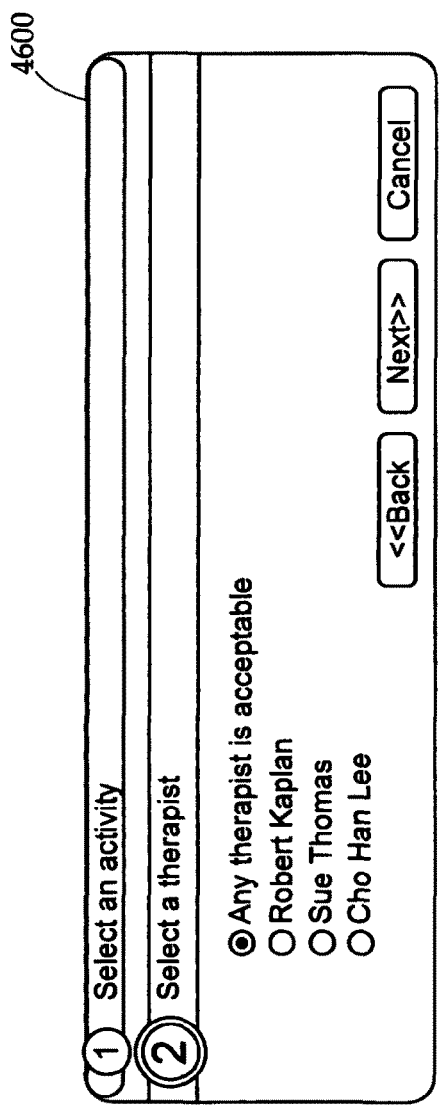
FIG. 15*a* illustrates a window of the web-based visual user interface in which an invitee may select which inviter they wish to schedule an appointment with. This figure illustrates the flexibility that results by using combined building block objects in selecting various combinations of data members associated with the building block objects used in selecting an invitation.

FIG. 15 illustrates a superset of building block data structures 4500 that contains multiple sets of building block data structures 4200, wherein said multiple sets of building block data structures 4200 may contain members of other sets of building block data structures 4200. What determines membership into any particular set of building block data structures is the presence of at least one data field that contains the same data value among the building blocks data structures 4150 contained within said set. FIG. 15a illustrates a select an inviter user interface window 4600 in which an invitee may select an individual inviter data value 4650 associated with one of the different data values 4150 in the various building block data structures 4000 contained within said superset and said sets of building block data structures 4500, 4200. Upon selecting one of said inviter data values 4650 and selecting the "next" button the system would then display a similar user interface window that prompts the invitee to select a date and time for the activity previously selected.

It should be noted that a set of building block data structures 4100 and the superset of building block data structures 4500 illustrated in FIGS. 14 and 15 are, in essence, a combinations of other basic building block objects 4000 that allow for the configuration of more complex scheduling systems comprising multiple schedulable resources (inviters) and multiple schedulable activities comprising physical face-to-face meetings and physically conducted teleconferences. Further, the applications of individual and combined building block objects 4000 include as reference data to publish URL invitations through which invitees may schedule appointments for activities contained within the building block object, and also as data objects referenced in email invitation sent by an inviter to invitees for the purpose of scheduling appointments for the activity referenced by the building block object.

In various other embodiments, the appointment scheduling system may utilize various formats of user interface windows of different styles and designs. Further, various variations on the steps listed here may be made and should the disclosure of only those steps described above should not in any way be interpreted as intended to limit the instant invention to only those embodiments described herein.

What is claimed is:

1. An appointment scheduling method comprising representing an appointment as an actionable data collection said method further comprising:
    generating user interactive abstract representations of available timeslots using a computer;
    distributing a set of invitations to schedule appointments;
    wherein said actionable data collection comprises a set of data members and interacting with said set of data members;
utilizing said actionable data collections to encapsulate said invitations to schedule appointments, wherein said invitations are non-selectively distributed;
utilizing said actionable data collections to configure complex scheduling systems;
    utilizing in a computer said actionable data collections to encapsulate said set of invitations to schedule appointments, wherein said encapsulation comprises initiating scheduling an appointment, wherein said scheduling an appointment is contained within a set of selectively distributed invitations to schedule appointments;
wherein said generating abstract representations of available timeslots comprises:
    allowing users to select units of time for availability to select appointments;
    ensuring that a set of appointment time availability slots are not generated in instances wherein said appointment time availability slots extend beyond of user defined fixed invitation acceptance times and in instances wherein said appointment time availability slots extend beyond recurring user defined appointment time availability slots;
    ensuring that a set of subsequently generated appointment time availability slots are not generated beyond a user selected recurrence end period;
    allowing for a contingency that said set of generated appointment time availability slots are not generated when prior commitments of the inviter conflict with said units of time for availability to select appointments;
    ensuring that said set of generated appointment time availability slots are not generated for the current day;
    ensuring that said set of generated appointment time availability slots are not generated beyond a selected number of time units into the future; and
    ensuring that only a maximum number of generated appointment time availability slots are generated for a given unit of time.

2. The appointment scheduling method of claim 1, wherein said method further comprises distributing user interactive invitations to schedule appointments.

3. The appointment scheduling method of claim 1, wherein distributing said invitations to schedule appointments comprises:
    distributing an invitation to schedule appointments to at least one invitee through a distribution means;
    embedding a user activateable selection member into said distribution means, wherein said user activateable selection member comprises a user-definable message; and
    monitoring the responses of said invitations to schedule appointments, wherein said invitations to schedule appointments are distributed by said distribution means.

4. The appointment scheduling method of claim 3, wherein said method further comprises allowing users to inspect said set of appointment time availability slots before said appointment time availability slots are generated.

5. An invitation driven appointment scheduling method comprising generating a plurality of visual representations of available timeslots the method further comprising;
    wherein said method further comprises representing a set of invitations to schedule an appointment as an object using a computer;
    wherein said method further comprises distributing said set of invitations to schedule appointments over a network;
    wherein said object comprises interacting with said object;
utilizing in a computer said object to encapsulate said invitations to schedule appointments, wherein said invitations to schedule appointments are non-selectively distributed:
utilizing said object to configure complex scheduling systems, wherein said complex scheduling systems comprise a set of multiple schedulable resources;
utilizing said object to encapsulate said invitations to schedule appointments, wherein said encapsulation of said invitations to schedule appointments comprises initiating scheduling an appointment, wherein said scheduling an appointment is contained within a set of selectively distributed invitations to schedule appointments over a network;
wherein said generating visual representations of available timeslots comprises:
    allowing users to select a set of units of available time for receiving appointments;
    ensuring that generated appointment time availability slots are not generated for said units of available time for receiving appointments when said units of available time for receiving appointments selected by users conflicts with prior commitments of users, wherein said prior commitments of users are recorded in the primary calendar of a user;

ensuring that said appointment time availability slots are not generated in instances wherein said appointment time availability slots extend beyond a set of user defined fixed invitation acceptance times and not generated in instances wherein said appointment time availability slots extend beyond recurring user defined appointment time availability slots;

ensuring that said generated set of appointment time availability slots are not generated beyond a user selected recurrence end period, wherein said user selected recurrence end period is comprised of a member of the group consisting of a specific minute, a specific hour, a specific day, a specific month a specific year and a specific date;

ensuring that said generated set of appointment time availability slots are not generated for a current day;

ensuring that generated appointment time availability slots are not generated beyond a selected number of time units into the future;

allowing for the assurance that only a maximum number of generated appointment time availability slots are generated for a given unit of time.

6. The invitation driven appointment scheduling method of claim 5, wherein said method further comprises distributing said set of invitations to schedule appointments over a network.

7. The invitation driven appointment scheduling method of claim 5, wherein said distributing said invitations to schedule appointments over a network comprises:
   distributing an invitation to schedule appointments to at least one invitee through an electronic distribution means over a network;
   embedding a user activateable selection button into said electronic distribution means over a network, wherein said user activateable selection button comprises a user-defined message; and
   tracking the responses of said invitations to schedule appointments, wherein said invitations to schedule appointments are distributed by said electronic distribution means over a network.

8. The invitation driven appointment scheduling method of claim 7, wherein said method further comprises allowing users to visually inspect said appointment time availability slots before said appointment time availability slots are generated.

9. A computerized invitation driven appointment scheduling method comprising distributing invitations to schedule appointments by an electronic mail system the method further comprising:
   wherein said method further comprises generating a set of graphical representations of available timeslots using a computer;
   wherein said method further comprises representing an appointment as an object;
   wherein said object comprises interacting with said object;
      utilizing said object to encapsulate said invitations to schedule appointments, wherein said invitations are distributed by an electronic mail system;
      utilizing said object to configure a set of complex scheduling systems, wherein said set of complex scheduling systems comprise a plurality of multiple schedulable resources and a plurality of multiple schedulable activities;
      utilizing in a computer said object to encapsulate said invitations to schedule appointments, wherein said object to encapsulate said invitations to schedule appointments comprises initiating scheduling an appointment, wherein said scheduling an appointment is embedded as an instance of said object within said invitations to schedule appointments and, wherein said invitations to schedule appointments are distributed by an electronic mail system;
   wherein said generating visual representations of available timeslots comprises:
      allowing users to select a set of units of available time for receiving appointments;
      ensuring that a set of generated appointment time availability slots are not generated for said set of units of available time for receiving appointments when said set of units of available time for receiving appointments selected by a plurality of users conflicts with a plurality of prior commitments of users, wherein said plurality of prior commitments of users are recorded in a primary calendar of an individual user and, wherein said primary calendar comprises a member selected from the group consisting of a Microsoft Outlook Calendar and a Google Calendar;
      ensuring that said appointment time availability slots are not generated when said appointment time availability slots extend beyond a set of user defined fixed invitation acceptance times and when said appointment time availability slots extend beyond a set of recurring user defined appointment time availability slots;
      ensuring that generated appointment time availability slots are not generated beyond a user selected recurrence end period, wherein said user selected recurrence end period comprises a member selected from the group consisting of a specific number of days into the future, a specific number of weeks into the future, a specific number of months, a specific number of years into the future and a specific future date;
      ensuring that generated appointment time availability slots are not generated for a current day;
      ensuring that generated appointment time availability slots are not generated beyond a user selected number of time units into the future, wherein said time units comprise a member selected from the group consisting of days, weeks, months and years;
      ensuring that only a maximum number of generated appointment time availability slots are generated for a given time unit, wherein said time unit comprises a member selected from the group consisting of days, weeks, months and years.

10. The computerized invitation driven appointment scheduling method of claim 9, wherein said method further comprises representing an appointment as an object.

11. The computerized invitation driven appointment scheduling method of claim 9, wherein said distributing said invitations over a network to schedule appointments comprises:
   distributing an invitation to schedule appointments to at least one invitee through an electronic mail distribution means;
   embedding a user activateable selection button into said electronic mail distribution means, wherein said user activateable selection button comprises a user-defined message;
   tracking the delivery of said invitations to schedule appointments distributed by said electronic mail distribution means; and tracking the responses of said invitations to schedule appointments distributed by said electronic mail distribution means.

12. The invitation driven appointment scheduling method of claim 11, wherein said method further comprises allowing users to visually inspect said appointment time availability slots before said appointment time availability slots are generated.

13. An Internet-based invitation driven appointment scheduling method comprising:
representing an appointment as an actionable data collection using a computer;
generating abstract representations of available timeslots; and
distributing invitations to schedule appointments wherein said actionable data collection comprises a set of data members and interacting with said set of data members;
utilizing said actionable data collections to encapsulate said invitations to schedule appointments, wherein said invitations are non-selectively distributed;
utilizing said actionable data collection to configure complex scheduling systems;
utilizing in a computer said actionable data collection to encapsulate said invitations to schedule appointments, wherein said means comprises initiating scheduling an appointment, wherein said scheduling an appointment is contained within a set of selectively distributed invitations to schedule appointments;
wherein said generating abstract representations of available timeslots comprises:
allowing users to select a set of units of time for availability to select appointments;
ensuring that said appointment time availability slots are not generated in instances wherein said appointment time availability slots extend beyond a set of user defined fixed invitation acceptance times and in instances wherein said appointment time availability slots extend beyond a set of recurring user defined appointment time availability slots;
ensuring that a set of generated appointment time availability slots are not generated beyond a user selected recurrence end period;
allowing that said set of generated appointment time availability slots are not generated when a set of prior commitments of the inviter conflict with said units of time for availability to select appointments;
ensuring that said set of generated appointment time availability slots are not generated for the current day;
ensuring that said set of generated appointment time availability slots are not generated beyond a selected number of time units into the future;
ensuring that only a maximum number of generated appointment time availability slots are generated for a given unit of time.

14. The Internet-based invitation driven appointment scheduling method of claim 13, wherein said distributing said invitations to schedule appointments comprises:
distributing an invitation to schedule appointments to at least one invitee through an Internet distribution means;
embedding a user activateable selection member into said Internet distribution means, wherein said user activateable selection member comprises a user-definable message; and
monitoring the responses of said invitations to schedule appointments distributed by said distribution means.

15. The Internet-based invitation driven appointment scheduling method of claim 14, wherein said method further comprises allowing users to inspect said appointment time availability slots before said appointment time availability slots are generated.

16. An Internet-based invitation driven appointment scheduling method comprising:
generating a set of visual representations of available timeslots using a computer;
representing a set of invitations to schedule an appointment as an object; and
distributing said set of invitations to schedule appointments over a network;
wherein said object comprises interacting with said object;
utilizing said object to encapsulate said invitations to schedule appointments, wherein said invitations are non-selectively distributed;
utilizing in said object to configure complex scheduling systems, wherein said complex scheduling systems comprise multiple schedulable resources;
utilizing in a computer said object to encapsulate said invitations to schedule appointments, wherein said encapsulation comprises initiating scheduling an appointment, wherein said scheduling an appointment is contained within a set of selectively distributed invitations to schedule appointments over a network;
wherein said generating visual representations of available timeslots comprises:
allowing users to select a set of units of available time for receiving appointments;
ensuring that a set of generated appointment time availability slots are not generated for said set of units of available time for receiving appointments when said units of available time for receiving appointments selected a by user conflicts with a set of prior commitments of said user, wherein said prior commitments of users are recorded in a primary calendar of said user;
ensuring that said appointment time availability slots are not generated in instances wherein said appointment time availability slots extend beyond a set of user defined fixed invitation acceptance times and in instances wherein said appointment time availability slots extend beyond a set of recurring user defined appointment time availability slots;
ensuring that said set of generated appointment time availability slots are not generated beyond a user selected recurrence end period;
ensuring that said set of generated appointment time availability slots are not generated for a current day;
ensuring that said set of generated appointment time availability slots are not generated beyond a selected number of time units into the future;
ensuring that only a maximum number of generated appointment time availability slots are generated for a given unit of time.

17. The Internet-based invitation driven appointment scheduling method of claim 16, wherein said distributing said invitations over a network to schedule appointments comprises:
distributing an invitation to schedule appointments to at least one invitee through an electronic distribution means;
embedding a user activateable selection button into said electronic distribution means, wherein said user activateable selection button comprises a user-defined message; and tracking a set of responses to said invitations to schedule appointments distributed by said electronic distribution means.

18. The Internet-based invitation driven appointment scheduling method of claim 17, wherein said method further comprises allowing said user to visually inspect said appointment time availability slots prior to generation of said appointment time availability slots.

19. A Web-based invitation driven appointment scheduling method comprising:
    representing an appointment as an object using a computer;
        generating a set of available graphical representations of timeslots; and
        distributing a set of invitations to schedule appointments by an electronic mail system;
        wherein said object comprises interacting with said object;
        utilizing said object to encapsulate said set of invitations to schedule appointments, wherein said invitations are distributed by said electronic mail system;
        utilizing said object to configure complex scheduling systems, wherein said complex scheduling systems comprise a set of multiple schedulable resources and a set of multiple schedulable activities;
        utilizing said object to encapsulate said invitations to schedule appointments, wherein said encapsulation of said invitations to schedule appointments comprises initiating scheduling an appointment, wherein said scheduling an appointment is encapsulated within said invitations to schedule appointments distributed by an electronic mail system;
    wherein said generating visual representations of available timeslots comprises:
        allowing users to select a set of units of available time for receiving appointments;
        ensuring that generated a set of appointment time availability slots are not generated for said set of units of available time for receiving appointments when said set of units of available time for receiving appointments selected by a user conflicts with a set of prior commitments of user, wherein said set of prior commitments of users are recorded in a primary calendar of said user, wherein said primary calendar comprises a member selected from the group consisting of a Microsoft Outlook Calendar and a Google Calendar;
        ensuring that said appointment time availability slots are not generated when said appointment time availability slots extend beyond user defined fixed invitation acceptance times and when said appointment time availability slots extend beyond recurring user defined appointment time availability slots;
        ensuring that a set of generated appointment time availability slots are not generated beyond a user selected recurrence end period, wherein said recurrence end period comprises a member of the group consisting of a specific minute, a specific hour, a specific day, a specific month, a specific year and a specific date;
        ensuring that a set of generated appointment time availability slots are not generated for the current day;
        ensuring that a set of generated appointment time availability slots are not generated beyond a user selected number of time units, wherein said time units comprise a member selected from the group consisting of days into the future, weeks into the future, months into the future and year into the future;
        ensuring that only a maximum number of generated appointment time availability slots are generated for a given time unit, wherein said time unit comprises a member selected from the group consisting of at least one day and at least one week.

20. The Web-based invitation driven appointment scheduling method of claim 19, wherein said distributing said invitations over a network to schedule appointments comprises:
    distributing an invitation to schedule appointments to at least one invitee through an electronic mail distribution means;
    embedding a user activateable selection button into said electronic mail distribution means, wherein said user activateable selection button comprises a user-defined message;
    tracking the delivery of said invitations to schedule appointments distributed by said electronic mail distribution means; and
    tracking the responses of said invitations to schedule appointments distributed by said electronic mail distribution means.

21. The Web-based invitation driven appointment scheduling method of claim 20, wherein said method further comprises allowing users to visually inspect said appointment time availability slots before said appointment time availability slots are generated.

22. A Web-based invitation driven appointment scheduling method comprising:
    representing an appointment as a building block object using a computer;
        generating available graphical representations of timeslots within a computerized graphical user interface; and
        distributing at least one invitation to schedule appointments by a non-text only electronic mail system;
        wherein said building block object comprises interacting with said object;
        utilizing said building block object to encapsulate said invitations to schedule appointments, wherein said invitations are distributed by electronic mail;
        utilizing said object to configure complex scheduling systems, wherein said complex scheduling systems comprise a set of schedulable resources and a set of schedulable activities;
        utilizing said object to encapsulate said invitations to schedule appointments, wherein said means comprises initiating scheduling an appointment, wherein said scheduling an appointment is contained within said invitations to schedule appointments distributed by said non-text-only based electronic mail;
    wherein said generating available graphical representations of timeslots within a computerized graphical user interface comprises:
        allowing users to select timeslots for receiving appointments, wherein said timeslots are represented in quarter hour intervals;
        ensuring that said timeslots are not generated for said timeslots for receiving appointments when said timeslots for receiving appointments selected by a user conflict with prior commitments of users, wherein said prior commitments of users are recorded in at least one primary user calendar, wherein said at least one primary user calendar comprises at least one member selected from the group consisting of a Microsoft Outlook Calendar and a Google Calendar;
        allowing that said timeslots are not generated when said appointment availability timeslots extend beyond user defined fixed invitation acceptance times and when said appointment availability timeslots extend beyond recurring user defined appointment availability timeslots;

ensuring that a set of generated timeslots are not generated beyond a user selected recurrence end period;

ensuring that said set of generated timeslots are not generated for the current day;

ensuring that said generated timeslots are not generated beyond a user selected number of weeks into the future;

ensuring that only a maximum number of generated available timeslots are generated for a given unit of time.

23. The Web-based invitation driven appointment scheduling method of claim 22, wherein said distributing said invitations over a network to schedule appointments comprises:

a step to disposed to distribute an invitation to schedule appointments to at least one invitee through a non-text-only electronic mail distribution means;

embedding a user activateable selection button into said electronic mail distribution means, wherein said user activateable selection button comprises a user-defined message;

tracking the delivery of said invitations to schedule appointments distributed by said non-text-only electronic mail distribution means; and tracking the responses of said invitations to schedule appointments distributed by said non-text-only electronic mail distribution means.

24. The Web-based invitation driven appointment scheduling method of claim 23, wherein said method further comprises allowing users to visually inspect said appointment timeslots before said availability timeslots are generated.

25. A user-interactive Web-based invitation driven appointment scheduling method comprising:

representing an appointment as a building block object using a computer, wherein said building block object comprises:
 an activity data field;
 a resource data field;
 an appointment duration data field;
 an appointment type data field;
 an availability information data field;

generating available graphical user interface representations of timeslots within a user-interactive Web-based graphical user interface; and distributing at least one invitation to schedule appointments by a set of user-interactive graphical user interfaced electronic mail;

wherein said building block object further comprises interacting with said building block object;

utilizing said building block object to encapsulate said invitations to schedule appointments, wherein said invitations to schedule appointments are distributed by user-interactive graphical user interfaced electronic mail;

utilizing said building block object to configure a set of complex scheduling systems, wherein said set of complex scheduling systems comprise a multiplicity of sub-set building block objects, a multiplicity of schedulable resources and a multiplicity of schedulable activities;

utilizing said building block object to encapsulate said invitations to schedule appointments, wherein said encapsulation of said invitations to schedule appointments comprises initiating scheduling an appointment, wherein said scheduling an appointment is contained within a set of invitations to schedule appointments distributed by said user-interactive graphical user interfaced electronic mail;

wherein said generating available graphical user interface representations of timeslots within a user-interactive Web-based graphical user interface comprises:

allowing user to select a set of timeslots for receiving appointments, wherein said timeslots are defined in quarter hour intervals;

ensuring that a second set of timeslots are not generated for said set of timeslots for receiving appointments selected by a user in instances wherein said set of timeslots for receiving appointments selected by users conflicts with prior commitments of said user, wherein said prior commitments of users are recorded in a primary user calendar, wherein said primary user calendar comprises a member selected from the group consisting of a Microsoft Outlook Calendar and a Google Calendar;

ensuring that said timeslots are not generated in instances, wherein said appointment availability timeslots extend beyond a set of user defined fixed invitation acceptance times and in instances wherein said appointment availability timeslots extend beyond recurring user defined appointment availability timeslots;

ensuring that said set of generated timeslots are not generated beyond a user selected recurrence end period, wherein said recurrence end period comprises a specific date;

ensuring that said set of generated timeslots are not generated for the instant day;

allowing ensure that said set of generated timeslots are not generated beyond a user selected number of weeks into the future;

ensuring that only a maximum number of said set of generated available timeslots are generated for any given day.

26. The user-interactive Web-based invitation driven appointment scheduling method of claim 25, wherein said distributing at least one set of invitations to schedule appointments by a user-interactive graphical user interfaced electronic mail system comprises:

distributing a set of invitations to schedule appointments to at least one invitee through a user-interactive graphical user interfaced electronic mail system;

embedding a user activateable selection button into said user-interactive graphical user interfaced electronic mail system, wherein said user activateable selection button comprises a user-defined message;

tracking the delivery of said set of invitations to schedule appointments distributed by said distributing at least one invitation to schedule appointments by user-interactive graphical user interfaced electronic mail system; and tracking the responses of said invitations to schedule appointments distributed by said set of user-interactive graphical user interfaced electronic mail system.

27. The user-interactive Web-based invitation driven appointment scheduling method of claim 26, wherein said method further comprises allowing users to visually inspect said set of appointment availability timeslots before said set of appointment availability timeslots are generated.

28. An appointment scheduling method comprising representing an appointment to schedule a physical face-to-face meetings as an actionable data collection; the method further comprising:

generating user interactive abstract representations of available timeslots using a computer;
distributing a set of invitations to schedule appointments;
wherein said actionable data collection comprises a set of data members and interacting with said set of data members;
utilizing said actionable data collections to encapsulate said invitations to schedule appointments, wherein said invitations are non-selectively distributed;
utilizing said actionable data collections to configure complex scheduling systems;
utilizing said actionable data collections to encapsulate said set of invitations to schedule appointments, wherein said means comprises initiating scheduling an appointment, wherein said scheduling an appointment is contained within a set of selectively distributed invitations to schedule appointments;
wherein said generating abstract representations of available timeslots comprises:
  allowing users to select units of time for availability to select appointments;
  ensuring that a set of appointment time availability slots are not generated in instances wherein said appointment time availability slots extend beyond of user defined fixed invitation acceptance times and in instances wherein said appointment time availability slots extend beyond recurring user defined appointment time availability slots;
  ensuring that a set of subsequently generated appointment time availability slots are not generated beyond a user selected recurrence end period;
  allowing for a contingency that said set of generated appointment time availability slots are not generated when prior commitments of the inviter conflict with said units of time for availability to select appointments;
  ensuring that said set of generated appointment time availability slots are not generated for the current day;
  ensuring that said set of generated appointment time availability slots are not generated beyond a selected number of time units into the future;
  ensuring that only a maximum number of generated appointment time availability slots are generated for a given unit of time.

29. The appointment scheduling method of claim 28, wherein said method further comprises distributing user interactive invitations to schedule appointments.

30. The appointment scheduling method of claim 28, wherein said generating abstract representations of available timeslots comprises:
  allowing users to select units of time for availability to select appointments;
  ensuring that a set of appointment time availability slots are not generated in instances wherein said appointment time availability slots extend beyond of user defined fixed invitation acceptance times and in instances wherein said appointment time availability slots extend beyond recurring user defined appointment time availability slots;
  ensuring that a set of subsequently generated appointment time availability slots are not generated beyond a user selected recurrence end period;
  allowing for a contingency that said set of generated appointment time availability slots are not generated when prior commitments of the inviter conflict with said units of time for availability to select appointments;
  ensuring that said set of generated appointment time availability slots are not generated for the current day;
  ensuring that said set of generated appointment time availability slots are not generated beyond a selected number of time units into the future;
  ensuring that only a maximum number of generated appointment time availability slots are generated for a given unit of time.

31. The appointment scheduling method of claim 30, wherein said distributing said invitations to schedule appointments comprises:
  distributing an invitation to schedule appointments to at least one invitee through a distribution means;
  embedding a user activateable selection member into said distribution means, wherein said user activateable selection member comprises a user-definable message; and
  monitoring the responses of said invitations to schedule appointments, wherein said invitations to schedule appointments are distributed by said distribution means.

32. The appointment scheduling method of claim 31, wherein said method further comprises allowing users to inspect said set of appointment time availability slots before said appointment time availability slots are generated.

33. An invitation driven appointment scheduling method comprising generating a plurality of visual representations of available timeslots the method further comprising:
  representing a set of invitations to schedule an appointment for a physical face-to-face meeting as an object using a computer;
wherein said method further comprises distributing said set of invitations to schedule appointments over a network;
wherein said method further comprises distributing said set of invitations to schedule appointments over a network;
wherein said object comprises interacting with said object;
  utilizing said object to encapsulate said invitations to schedule appointments, wherein said invitations to schedule appointments are non-selectively distributed;
  utilizing said object to configure complex scheduling systems, wherein said complex scheduling systems comprise a set of multiple schedulable resources;
  utilizing said object to encapsulate said invitations to schedule appointments, wherein said encapsulation of said invitations to schedule appointments comprises initiating scheduling an appointment, wherein said scheduling an appointment is contained within a set of selectively distributed invitations to schedule appointments over a network;
wherein said generating visual representations of available timeslots comprises:
  allowing users to select a set of units of available time for receiving appointments;
  ensuring that generated appointment time availability slots are not generated for said units of available time for receiving appointments when said units of available time for receiving appointments selected by users conflicts with prior commitments of users, wherein said prior commitments of users are recorded in the primary calendar of a user;
  ensuring that said appointment time availability slots are not generated in instances wherein said appointment time availability slots extend beyond a set of user defined fixed invitation acceptance times and not generated in instances wherein said appointment time availability slots extend beyond recurring user defined appointment time availability slots;
  ensuring that said generated set of appointment time availability slots are not generated beyond a user selected recurrence end period, wherein said user selected recurrence end period is comprised of a member of the group consisting of a specific minute, a specific hour, a specific day, a specific month a specific year and a specific date;

ensuring that said generated set of appointment time availability slots are not generated for a current day;

ensuring that generated appointment time availability slots are not generated beyond a selected number of time units into the future;

allowing for the assurance that only a maximum number of generated appointment time availability slots are generated for a given unit of time.

34. The invitation driven appointment scheduling method of claim 33, wherein said distributing said invitations to schedule appointments over a network comprises:

distributing an invitation to schedule appointments to at least one invitee through an electronic distribution means over a network;

embedding a user activateable selection button into said electronic distribution means over a network, wherein said user activateable selection button comprises a user-defined message; and tracking the responses of said invitations to schedule appointments, wherein said invitations to schedule appointments are distributed by said electronic distribution means over a network.

35. The invitation driven appointment scheduling method of claim 34, wherein said method further comprises allowing users to visually inspect said appointment time availability slots before said appointment time availability slots are generated.

36. A computerized invitation driven appointment scheduling method comprising distributing invitations to schedule appointments for physical face-to-face meetings by an electronic mail system the method further comprising:

wherein said method further comprises representing an appointment as an object using a computer;

wherein said method further comprises representing an appointment as an object;

wherein said method further comprises representing an appointment as an object;

wherein said object comprises interacting with said object;

utilizing said object to encapsulate said invitations to schedule appointments, wherein said invitations are distributed by an electronic mail system;

utilizing said object to configure a set of complex scheduling systems, wherein said set of complex scheduling systems comprise a plurality of multiple schedulable resources and a plurality of multiple schedulable activities;

utilizing said object to encapsulate said invitations to schedule appointments, wherein said encapsulation of said invitations to schedule appointments comprises initiating scheduling an appointment, wherein said scheduling an appointment is embedded as an instance of said object within said invitations to schedule appointments and, wherein said invitations to schedule appointments are distributed by an electronic mail system;

wherein said generating visual representations of available timeslots comprises:

allowing users to select a set of units of available time for receiving appointments;

ensuring that a set of generated appointment time availability slots are not generated for said set of units of available time for receiving appointments when said set of units of available time for receiving appointments selected by a plurality of users conflicts with a plurality of prior commitments of users, wherein said plurality of prior commitments of users are recorded in a primary calendar of an individual user and, wherein said primary calendar comprises a member selected from the group consisting of a Microsoft Outlook Calendar and a Google Calendar;

ensuring that said appointment time availability slots are not generated when said appointment time availability slots extend beyond a set of user defined fixed invitation acceptance times and when said appointment time availability slots extend beyond a set of recurring user defined appointment time availability slots;

ensuring that generated appointment time availability slots are not generated beyond a user selected recurrence end period, wherein said user selected recurrence end period comprises a member selected from the group consisting of a specific number of days into the future, a specific number of weeks into the future, a specific number of months, a specific number of years into the future and a specific future date;

ensuring that generated appointment time availability slots are not generated for a current day;

ensuring that generated appointment time availability slots are not generated beyond a user selected number of time units into the future, wherein said time units comprise a member selected from the group consisting of days, weeks, months and years;

ensuring that only a maximum number of generated appointment time availability slots are generated for a given time unit, wherein said time unit comprises a member selected from the group consisting of days, weeks, months and years.

37. The computerized invitation driven appointment scheduling method of claim 36, wherein said method further comprises generating a set of graphical representations of available timeslots.

38. The computerized invitation driven appointment scheduling method of claim 36, wherein said distributing said invitations over a network to schedule appointments comprises:

distributing an invitation to schedule appointments to at least one invitee through an electronic mail distribution means;

embedding a user activateable selection button into said electronic mail distribution means, wherein said user activateable selection button comprises a user-defined message;

tracking the delivery of said invitations to schedule appointments distributed by said electronic mail distribution means; and tracking the responses of said invitations to schedule appointments distributed by said electronic mail distribution means.

39. The invitation driven appointment scheduling method of claim 38, wherein said method further comprises allowing users to visually inspect said appointment time availability slots before said appointment time availability slots are generated.

40. An Internet-based invitation driven appointment scheduling method comprising:

representing an appointment to schedule physical face-to-face meetings as an actionable data collection using a computer;

generating abstract representations of available timeslots; and distributing invitations to schedule appointments for physical face-to-face meetings;

wherein said actionable data collection comprises a set of data members and interacting with said set of data members;

utilizing said actionable data collections to encapsulate said invitations to schedule appointments, wherein said invitations are non-selectively distributed;

utilizing said actionable data collection to configure complex scheduling systems;

utilizing said actionable data collection to encapsulate said invitations to schedule appointments, wherein said means comprises initiating scheduling an appointment, wherein said scheduling an appointment is contained within a set of selectively distributed invitations to schedule appointments;

wherein said generating abstract representations of available timeslots comprises:

allowing users to select a set of units of time for availability to select appointments;

ensuring that said appointment time availability slots are not generated in instances wherein said appointment time availability slots extend beyond a set of user defined fixed invitation acceptance times and in instances wherein said appointment time availability slots extend beyond a set of recurring user defined appointment time availability slots;

ensuring that a set of generated appointment time availability slots are not generated beyond a user selected recurrence end period;

allowing that said set of generated appointment time availability slots are not generated when a set of prior commitments of the inviter conflict with said units of time for availability to select appointments;

ensuring that said set of generated appointment time availability slots are not generated for the current day;

ensuring that said set of generated appointment time availability slots are not generated beyond a selected number of time units into the future;

ensuring that only a maximum number of generated appointment time availability slots are generated for a given unit of time.

41. The Internet-based invitation driven appointment scheduling method of claim 40, wherein said distributing said invitations to schedule appointments comprises:

distributing an invitation to schedule appointments to at least one invitee through an Internet distribution means;

embedding a user activateable selection member into said Internet distribution means, wherein said user activateable selection member comprises a user-definable message; and monitoring the responses of said invitations to schedule appointments distributed by said distribution means.

42. The Internet-based invitation driven appointment scheduling method of claim 41, wherein said method further comprises allowing users to inspect said appointment time availability slots before said appointment time availability slots are generated.

* * * * *